(12) United States Patent
Mehra et al.

(10) Patent No.: US 8,577,864 B2
(45) Date of Patent: *Nov. 5, 2013

(54) SYSTEMS AND METHODS FOR PROVIDING A VALIDATION TOOL

(75) Inventors: Gaurav Mehra, Mason, OH (US); John Alexander Dalessio, Brooklyn, NY (US); Molly Miller, Walnut Creek, CA (US); Alison Manchester, Sedalia, CO (US)

(73) Assignee: LexisNexis, a division of Reed Elsevier, Inc., Miamisburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,390

(22) Filed: Aug. 2, 2012

(65) Prior Publication Data

US 2012/0296925 A1 Nov. 22, 2012

Related U.S. Application Data

(63) Continuation of application No. 13/042,821, filed on Mar. 8, 2011, now Pat. No. 8,239,415, which is a continuation of application No. PCT/US2011/022941, filed on Jan. 28, 2011.

(60) Provisional application No. 61/299,831, filed on Jan. 29, 2010.

(51) Int. Cl.
*G06F 17/30* (2006.01)

(52) U.S. Cl.
USPC ............................. 707/706; 707/736

(58) Field of Classification Search
USPC .......................... 707/705–706, 736
See application file for complete search history.

(56) References Cited

U.S. PATENT DOCUMENTS

| | | |
|---|---|---|
| 5,369,778 A | 11/1994 | San Soucie et al. |
| 5,715,443 A | 2/1998 | Yanagihara et al. |
| 5,812,134 A | 9/1998 | Pooser et al. |
| 5,870,770 A * | 2/1999 | Wolfe ........................ 715/805 |
| 5,873,076 A | 2/1999 | Barr et al. |
| 5,915,251 A | 6/1999 | Burrows et al. |
| 5,926,812 A | 7/1999 | Hilsenrath et al. |
| 6,058,435 A | 5/2000 | Sassin et al. |
| 6,263,351 B1 | 7/2001 | Wolfe |
| 6,848,077 B1 | 1/2005 | McBrearty et al. |
| 7,003,719 B1 | 2/2006 | Rosenoff et al. |
| 7,100,123 B1 | 8/2006 | Todd et al. |
| 7,293,017 B2 | 11/2007 | Hurst-Hiller et al. |

(Continued)

OTHER PUBLICATIONS

Ted Padova, Adobe Acrobat 7 PDF Bible, Mar. 4, 2005, Wiley Publishing Inc., p. 129-133.*

(Continued)

*Primary Examiner* — Thu-Nguyet Le
(74) *Attorney, Agent, or Firm* — Dinsmore & Shohl LLP

(57) ABSTRACT

Systems and methods for providing a validation tool may be configured to identify a plurality of words within a document, the document being provided in a first window within a user interface. Additionally, the systems and methods may be configured to determine, from a predetermined list that includes terms of interest, whether the words are matching words with terms of interest. The systems and methods may, in response to determining that the plurality of words are matching words with the terms of interest, highlight matching words in a document and access pieces of related data for matching words.

20 Claims, 32 Drawing Sheets

(56) References Cited

U.S. PATENT DOCUMENTS

| | | |
|---|---|---|
| 7,376,673 B1 | 5/2008 | Chalecki et al. |
| 7,490,109 B1 | 2/2009 | Sikchi et al. |
| 7,594,003 B2 | 9/2009 | Davidson et al. |
| 7,711,738 B1 | 5/2010 | Kraft et al. |
| 2004/0034625 A1* | 2/2004 | Reddy ................. 707/3 |
| 2004/0163050 A1 | 8/2004 | Matter |
| 2005/0177805 A1 | 8/2005 | Lynch et al. |
| 2005/0228788 A1* | 10/2005 | Dahn et al. ............ 707/3 |
| 2007/0172062 A1 | 7/2007 | Waldo et al. |
| 2007/0245260 A1 | 10/2007 | Koppert |
| 2008/0005651 A1 | 1/2008 | Grefenstette et al. |
| 2008/0102911 A1 | 5/2008 | Campbell et al. |
| 2009/0150827 A1* | 6/2009 | Meyer et al. ............ 715/810 |
| 2009/0240560 A1 | 9/2009 | Tamura |
| 2010/0005388 A1 | 1/2010 | Haschart et al. |
| 2010/0082709 A1 | 4/2010 | Yamamoto |

OTHER PUBLICATIONS

International Search Report and Written Opinion issued in Parent Application No. PCT/US2011/022941 on May 24, 2011.

First Examination Report, New Zealand IP Office, dated May 29, 2013, 2 pages.

* cited by examiner

FIG. 8

"find him." Id. (citation omitted). Fourth. The plaintiff's failure or inability to discover the identity of the wrongdoer does not postpone the accrual of the cause of action. Id. at 399. Fifth, a plaintiff who seeks to rely on discovery principles to avoid the statute of limitations bar bears the burden of establishing the facts underlying her inability to discover the claim.

Mckelvey v. North American Mfg. 74 Cal App 4th 151, 160, 86 Cal Rptr 2d 645 (Cal. Ct. App. 1999) 200 F. Supp.2d at 987-88 ○

Finally, as we noted in citation, resolution of the delayed discovery inquiry is normally a question of fact Id at 988 citing Jolly v. PharmCo and Company. 44 Cal. 3d 1103, 1112, 245 Cal. Rptr 658, 751 P2d 923 (Cal. 1988) △

Ms. Bayard hired counsel to investigate and pursue her claims within a week of the accident. That act. in itself. has been noted by California courts as the basis for a determination that the plaintiff had the reuiste suspicion to trigger the applicable limitations period. See Sunde v. Flack. 2002 Cal. App. Unpub. BIGcorp 9314 2002 WL 31235401 at *3, *5 (Cal. Ct. App. October 4, 2002) ◇ (point at which plaintiff considered retaining an "attorney" signaled suspicion Validation
Navigate [All Analysis (6)] [1 of 6] Show [Citations List]

Citations List

○ 1. Mckelvey v. North American Mfg. 74 Cal App 4th 151, 160, 86 Cal Rptr 2d 645 (Cal. Ct. App. 1999) 200 F. Supp.2d at 987-88

△ 2. Jolly v. PharmCo and Company. 44 Cal. 3d 1103, 1112, 245 Cal. Rptr 658, 751 P2d 923 (Cal. 1988)

◇ 3. Sunde v. Flack. 2002 Cal. App. Unpub. BIGcorp 9314 2002 WL 31235401 at *3, *5 (Cal. Ct. App. October 4, 2002)

○ 4. Savings Bank v. Fisher. 74 Cal. App. 3d 890, 896, 141 Cal. Rptr. 836 (1977)

Ⓐ 5. Mckelvey v. North American Mfg. 74 Cal App 4th 151, 160, 86 Cal Rptr 2d 645 (Cal. Ct. App. 1999) 200 F. Supp.2d at 987-88

△ 6. 2. Jolly v. PharmCo and Company. 44 Cal. 3d 1103, 1112, 245 Cal. Rptr 658,

FIG. 29

SYSTEMS AND METHODS FOR PROVIDING A VALIDATION TOOL

CROSS-REFERENCE TO RELATED APPLICATIONS

This application is a continuation of U.S. application Ser. No. 13/042,821 filed Mar. 8, 2011, which is a continuation of PCT International Application No. PCT/US2011/022941 filed Jan. 28, 2011, which claims the benefit of priority of U.S. Provisional Application Ser. No. 61/299,831 filed on Jan. 29, 2010, both of which are relied upon and incorporated herein by reference in their entireties.

BACKGROUND

1. Field

Embodiments provided herein generally relate to providing a validation tool, and particularly to providing a tool for researching information from a document.

2. Technical Background

Users who prepare legal and other documents may utilize one or more citations to legal references and/or other data within the document. While many users have access to an online research tool, oftentimes the online research tool may be configured such that it is difficult to locate appropriate citations that correspond to the subject matter in the document. Further, incorporation of a desired citation into the document may also be difficult.

Similarly, in some situations, a user may receive a document such as an email message that includes one or more citations or other terms of interest. Again, while the user may access the online research tool to locate supplemental information on the citation; oftentimes, it can be difficult to identify, locate, and associate the term of interest with the document.

SUMMARY

In one embodiment, a system for providing a validation tool may include a computing device that comprises a memory component, the memory component storing validation tool logic that causes the system to identify a plurality of words within a document, the document being provided in a first window within a user interface and determine whether, from a predetermined list that includes terms of interest, the plurality of words are matching words with the terms of interest. In some embodiments, the validation tool logic further causes the system to, in response to determining that the plurality of words are matching words with the terms of interest, highlight the matching words in the document and access pieces of related data for the matching words.

In another embodiment, a method for providing a validation tool may include identifying, by a computing device, a plurality of words within a document, the document being provided in a first window within a user interface, determining, from a predetermined list that includes terms of interest, whether the plurality of words are matching words with the terms of interest, and in response to determining that the plurality of words are matching words with the terms of interest, highlighting the matching words in the document. In some embodiments, the method includes accessing pieces of related data for the matching words, replacing each of the matching words in the document with a corresponding link to the pieces of related data and creating a second window within the user interface, and providing the pieces of related data in the second window as a virtual document stack, where selection of one of the pieces of related data in the virtual document stack causes the document in the first window to scroll to one of the matching words in the document.

In yet another embodiment, a non-transitory computer-readable medium for providing a validation tool may include a program that when executed by a computing device causes the computing device to identify a plurality of words within a document, the document being provided in a first window within a user interface, determine, from a predetermined list that includes terms of interest, whether the plurality of words are matching words with the terms of interest, and in response to determining that the plurality of words are matching words with the terms of interest, highlight the matching words in the document. In some embodiments, the program causes the computing device to access pieces of related data for the matching words, replace each of the matching words in the document with a corresponding link to the pieces of related data, and create a second window within the user interface and provide the pieces of related data in the second window as a virtual document stack, wherein selection of one of the pieces of related data in the virtual document stack causes the document in the first window to scroll to one of the matching words in the document.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 depicts a dual window document interface that includes a citations list associated with a term of interest, according to embodiments shown and described herein;

FIG. 10 depicts a dual window document interface that includes information related to the validly of a citation, according to embodiments shown and described herein;

FIG. 13 depicts a window document interface that includes search results found on a local area network, according to embodiments shown and described herein;

FIG. 24 depicts a dual window communicator interface including a personal term of interest, according to embodiments shown and described herein;

FIG. 25 depicts a dual window communicator interface including a citation term of interest, according to embodiments shown and described herein;

FIG. 28 depicts a matter management interface for providing matter status of a matter to which a user is authorized, according to embodiments shown and described herein;

FIG. 29 depicts a matter management interface that further includes page tools, according to embodiments shown and described herein;

DETAILED DESCRIPTION

Embodiments disclosed herein include systems, methods, and non-transitory computer-readable mediums for providing a validation tool. In some embodiments, a validation tool application may be utilized with a document application (such as a word processing application, spreadsheet application, web editor application, etc.) and/or a communicator application (such as an email application, instant messaging application, etc.). The validation tool application may be configured to analyze the content of a document to determine potential terms of interest. From the potential terms of interest, the validation tool can determine whether the potential terms of interest are similar to actual terms of interest. If so, the validation tool can provide supplemental data related to the terms of interest.

As an example, in the context of a word processing application, the validation tool may identify one or more legal citations (or other terms of interest) within a word processing document (or other stationary document). Once identified, the one or more legal citations may be highlighted, such as with a hyperlink. Upon a user selection of the highlighted citation, the validation tool can access an online research tool to locate the court documents (and/or other data) associated with that citation. The validation tool may additionally cause the word processing application to create a dual (tri, quad, etc.) window user interface for providing the word processing document, as well as a virtual stack of court documents located in the search. As the user scrolls the word processing document in the first window to a particular citation, the second window may automatically provide the corresponding legal document to that citation. Similarly, if the user locates a particular court document in the second window, the validation tool application may cause the word processing document in the first window to scroll to the corresponding citation.

As another example, in the context of an email application, a user may receive an email message (and/or other communications document) from another user. Upon receipt of the email message (and/or selection of a predetermined user option), the validation tool may analyze the contents of the email message to identify a business name (and/or other terms of interest). Upon identifying the business name, the validation tool application can highlight the identified business name (such as with a hyperlink, change of color, etc.). Upon a user selection of the highlighted business name, the validation tool application can facilitate retrieval of data that corresponds to the business name and can creation of a dual window user interface, with the email message in the first window. The corresponding data may be provided in the second window.

Figure 1:
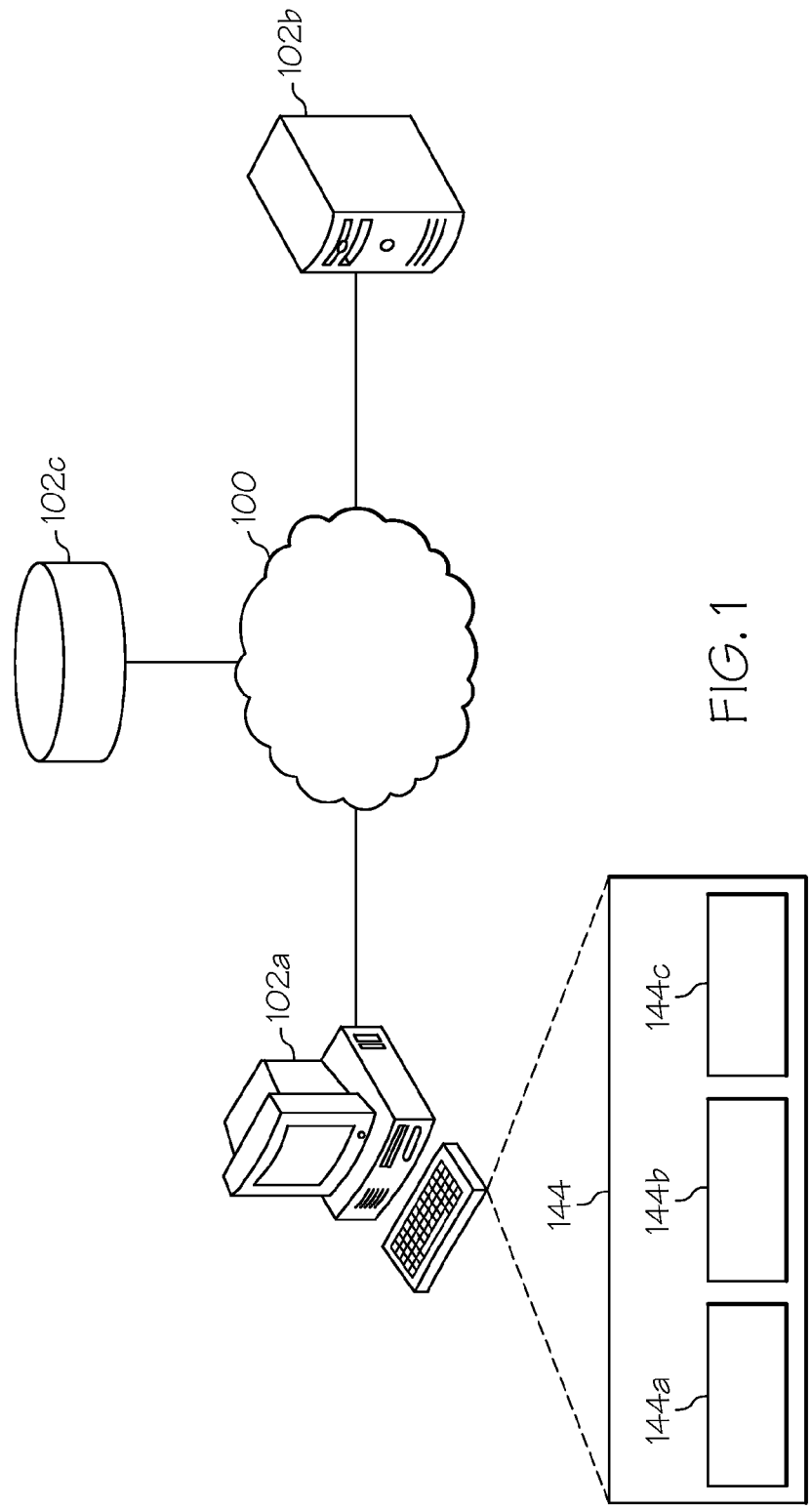
FIG. 1 depicts a computing environment for providing a validation tool, according to one or more embodiments shown and described herein.

Referring now to the drawings, FIG. 1 depicts a computing environment for providing a validation tool, according to one or more embodiments shown and described herein. As illustrated, a network 100 may be coupled to a local computing device 102a, a remote computing device 102b, and a remote data storage 102c. The network 100 may include a wide area network and/or a local area network and, thus may be wired and/or wireless. The local computing device 102a may include any portable and/or non-portable computing devices, such as personal computers, laptop computers, personal digital assistants (PDAs), mobile phones, etc. As discussed in more detail below, the local computing device 102*a* may include a memory component 144 that stores document logic 144*a*, communicator logic 144*b* and validation tool logic 144*c*. The document logic 144*a* may include word processing software, spreadsheet software, notepad software and/or any other software for viewing, creating and/or editing a stationary electronic document. Similarly, the communicator logic 144*b* may include an email application, an instant messaging application, a short message service (SMS) messaging application, a video chatting application, and/or any other application for facilitating the sending and/or receiving of a communication document. Additionally, the validation tool logic 144*c* may be configured for analyzing a document that is provided by the document logic 144*a* and/or communicator logic 144*b*, as described in more detail below.

Similarly, the remote computing device 102*b* may include a server and/or other computing device for providing information to the local computing device 102*a* via a request initiated by the validation tool logic 144*c*. In some embodiments, the remote computing device 102*b* may be configured to provide an online research tool, such as a legal research website, individual research tool, business tool, etc. Additionally, the remote computing device 102*b* may be configured to access the remote data storage 102*c* for one or more pieces of data. The remote data storage 102*c* may include a database and/or other data storage component that is accessed by the remote computing device 102*b*. In some embodiments, the remote data storage 102*c* may be configured as local area storage component that is accessed by the local computing device 102*a*, such as via a local area network. As an example, the local computing device 102*a* may be part of a law firm local area network. Additionally, the remote data storage 102*c* may be configured as a data management server such that firm documents may be accessible by the local computing device 102*a*.

It should be understood that while the remote computing device 102*b* and the remote data storage 102*c* are represented in FIG. 1 each as a single component, this is merely an example. More specifically, in some embodiments, there may be numerous different remote computing devices 102*b* and/or remote data storages 102*c* (each with different functionality). However, for illustration purposes, a single component is shown in FIG. 1 and described herein.

Figure 2:
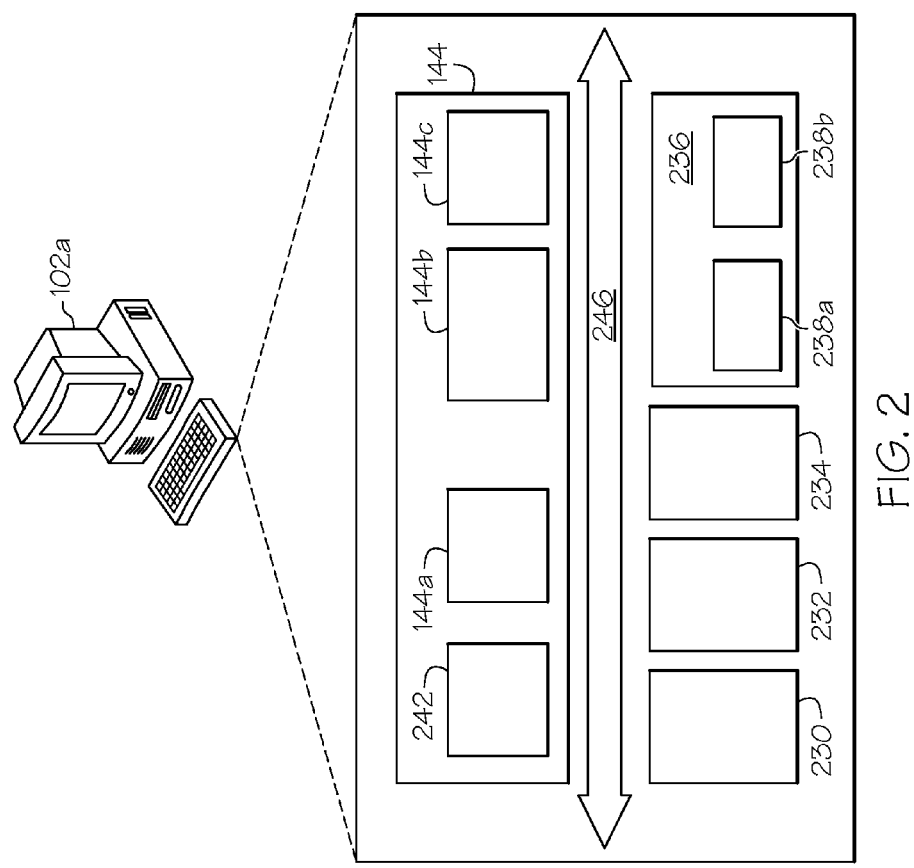
FIG. 2 depicts a computing device that may provide the validation tool, according to one or more embodiments shown and described herein.

FIG. 2 depicts the local computing device 102*a* that may provide the validation tool, according to one or more embodiments shown and described herein. In the illustrated embodiment, the local computing device 102*a* includes a processor 230, input/output hardware 232, network interface hardware 234, a data storage component 236 (which stores document data 238*a*, message data 238*b*, and/or other data), and the memory component 144. The memory component 144 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the local computing device 102*a* and/or external to the local computing device 102*a*.

Additionally, the memory component 144 may store operating logic 242, the document logic 144*a*, the communicator logic 144*b*, and the validation tool logic 144*c*. The document logic 144*a*, the communicator logic 144*b*, and the validation tool logic 144*c* may each include a plurality of different pieces of logic, each of which may be embodied as a computer program, firmware, and/or hardware, as an example. A local interface 246 is also included in FIG. 2 and may be implemented as a bus or other interface to facilitate communication among the components of the local computing device 102*a*.

The processor 230 may include any processing component operable to receive and execute instructions (such as from the data storage component 236 and/or the memory component 144). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the local computing device 102*a* and other computing devices.

The operating logic 242 may include an operating system and/or other software for managing components of the local computing device 102*a*. Similarly, as discussed above, the document logic 144*a* may reside in the memory component 144 and may be configured to cause the processor 230 to provide a stationary document, such as a word processing document, spreadsheet document, notepad document, and/or other document that includes electronic text. Additionally, the communicator logic 144*b* may be configured to cause the processor 230 to provide a communication document, such as an email message, instant message, etc. The validation tool logic 144*c* may be configured to be executed in conjunction with the document logic 144*a* and/or the communicator logic 144*b*. Other functionality is also included and described in more detail, below.

It should be understood that the components illustrated in FIG. 2 are merely exemplary and are not intended to limit the scope of this disclosure. While the components in FIG. 2 are illustrated as residing within the local computing device 102*a*, this is merely an example. In some embodiments, one or more of the components may reside external to the local computing device 102*a*. It should also be understood that, while the local computing device 102*a* in FIG. 2 is illustrated as a single device, this is also merely an example. In some embodiments, the document logic 144*a*, the communicator logic 144*b*, and the validation tool logic 144*c* may reside on different devices.

Additionally, while the local computing device 102*a* is illustrated with the document logic 144*a*, the communicator logic 144*b*, and the validation tool logic 144*c* as separate logical components, this is also an example. In some embodiments, a single piece of logic may cause the local computing device 102*a* to perform the described functionality.

Figure 3:
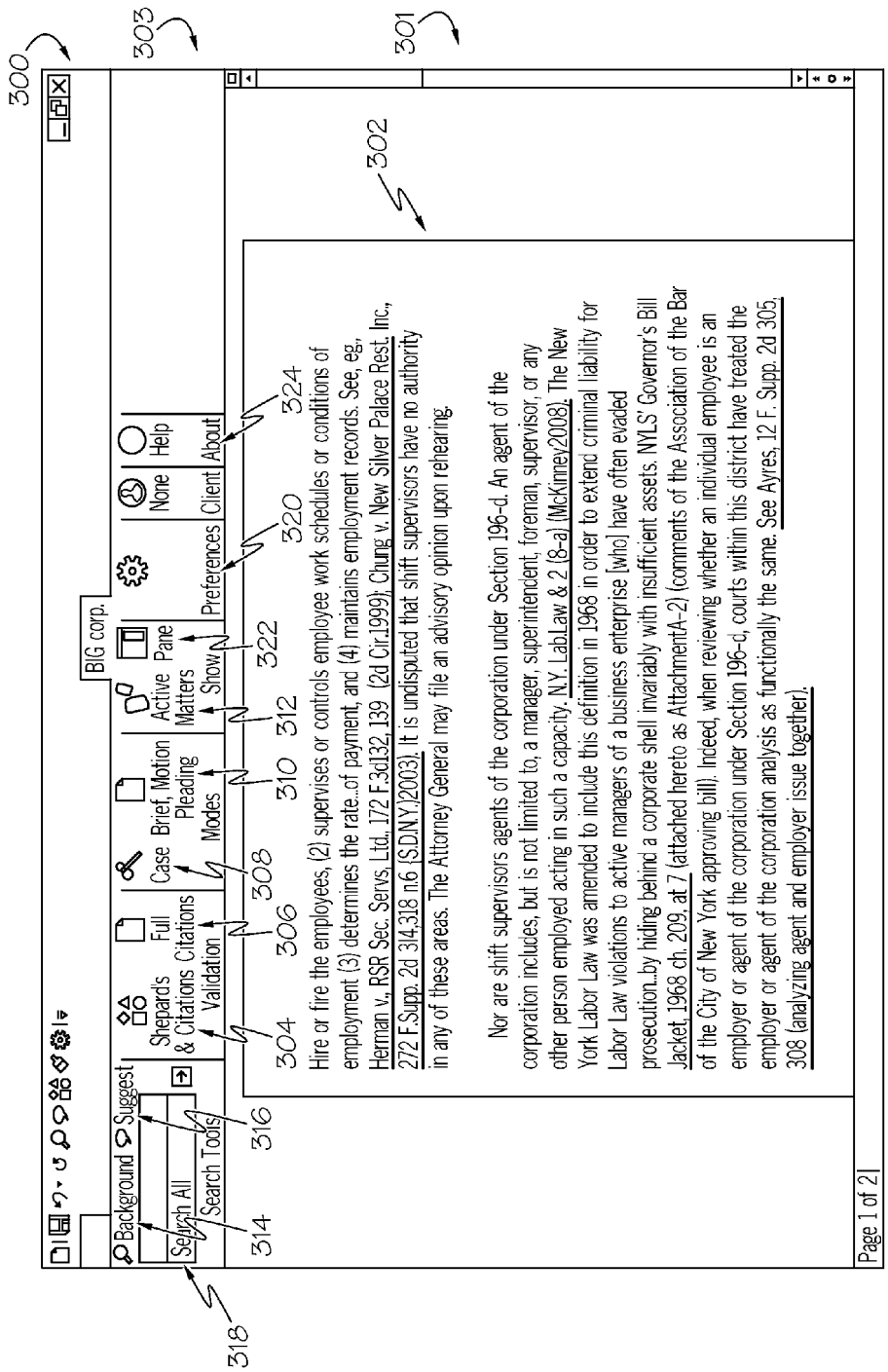
FIG. 3 depicts a document interface that includes a citation option, according to one or more embodiments shown and described herein.

FIG. 3 depicts a document interface 300 that includes a citation option 304, according to one or more embodiments shown and described herein. As illustrated, the local computing device 102*a* may provide a word processing and/or other document application via the document logic 144*a*. The document application may provide a document 302 in a window 301. The document 302 may include text (e.g., a word or plurality of words). Additionally, the local computing device 102*a* may also provide a validation tool 303 via the validation tool logic 144*c*. The validation tool 303 may take the form of a toolbar, ribbon or other add-on to the document logic 144*a* (and/or communicator logic 144*b*). In the example of FIG. 3, the validation tool 303 includes a plurality of options, such as the citation option 304, a "pull citations" option 306, a "case mode" option 308, a "brief, motion, pleading mode" option 310, an "active matters" option 312, a "background" option 314, a "suggest" option 316, a "search" option 318, a "preferences" option 320, a "show pane" option 322, and a "help" option 324.

As discussed in more detail below, the citation option 304 may cause the local computing device 102a to analyze the document 302 and determine whether there are any words in the document 302 that are formatted as a term of interest (such as a legal citation). The pull citations option 306 may cause the local computing device 102a to access an online research tool to retrieve corresponding legal (or other) documents that are associated with the words that correspond with the term of interest. The case mode option 308 may cause the local computing device 102a to facilitate a search function for legal cases using at least a portion of the document 302 as the search criteria. The brief, motion, pleading mode option 310, may similarly utilize at least a portion of the document 302 as the search criteria for other legal documents, such as briefs, motions, and pleadings.

The background option 314 may cause the local computing device 102a to analyze the document 302 for any potential terms of interest. As an example, the analysis may include determining legal cases, business entities, people, and/or other terms of interest that reside within the document 302. The suggest option 316 may cause the local computing device 102a to search for a user-defined word (or plurality of words) within the document 302 to determine if the user-defined word corresponds with a term of interest. The keyword search option 318 may be configured to facilitate a search of a keyword that is entered by the user. The preferences option 320 may cause the local computing device 102a to provide one or more options for customizing the validation tool 303. The show pane option 322 may cause the local computing device 102a to change the display of the document 302 and/or other data. The help option 324 may cause the local computing device 102a to provide assistance for utilizing the validation tool 303.

Figure 4:
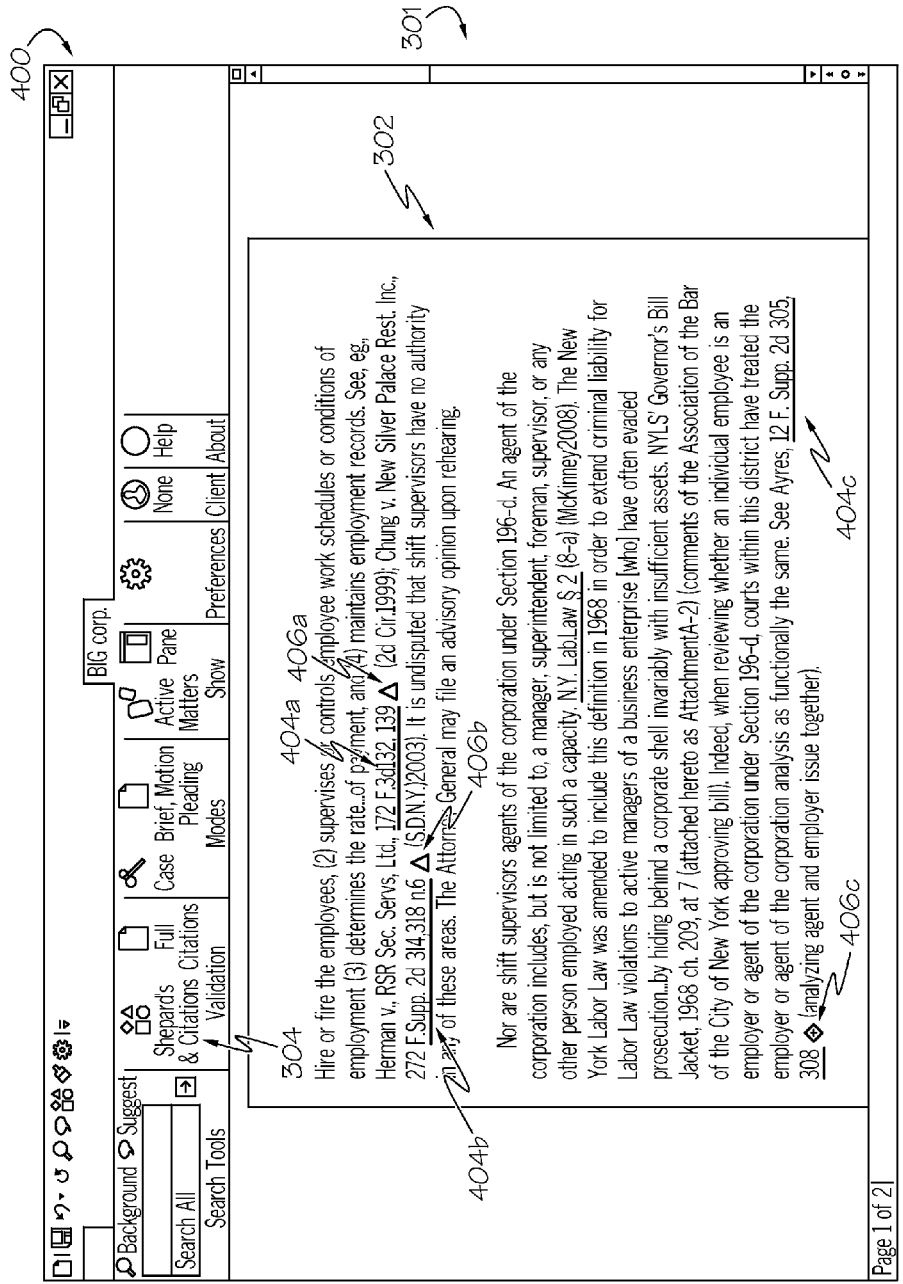
FIG. 4 depicts a document interface that includes a plurality of words that are formatted as terms of interest, according to one or more embodiment shown and described herein.

FIG. 4 depicts a document interface 400 that includes a plurality of words that are formatted as terms of interest, according to one or more embodiment shown and described herein. As illustrated, the document interface 400 includes the document 302 from FIG. 3. However, in the document interface 400, a user has selected the citation option 304. In response to this selection, the validation tool logic 144c causes the local computing device 102a to determine whether there are legal citations within the document 302. In response to determining that there are legal citations within the document 302, the local computing device 102a can highlight the citations, determine any inaccuracies in the citations, identify whether the citations are valid law, and identify to what extent the citations relate to valid law.

As illustrated, the document 302 may be altered to highlight the citations 404a, 404b, and 404c. Additionally, corresponding links (such as a hyperlink) to related data may also be provided. By selecting one of the links, the local computing device 102a may access the corresponding legal document (such as a court opinion, etc.), as described in more detail below. Also included are validity signifiers 406a, 406b, and 406c, which may indicate whether the citation refers to a legal opinion that is considered "valid law" and the extend of that validity. By selecting a validity signifier 406, the local computing device 102a may access data related to the validity of the corresponding legal document.

It should be understood that while in some embodiments, selection of the citation option 304 may alter the document 302, this is merely an example. In some embodiments, the document 302 may remain unchanged, while a second document may be opened that includes these features. Similarly, in some embodiments, the document 302 may be altered as described above, with a user option to return the document 302 to its original form. In still some embodiments, the document may be altered as described above, but such alterations are not provided when the document is sent to another person and/or printed.

Figure 5:
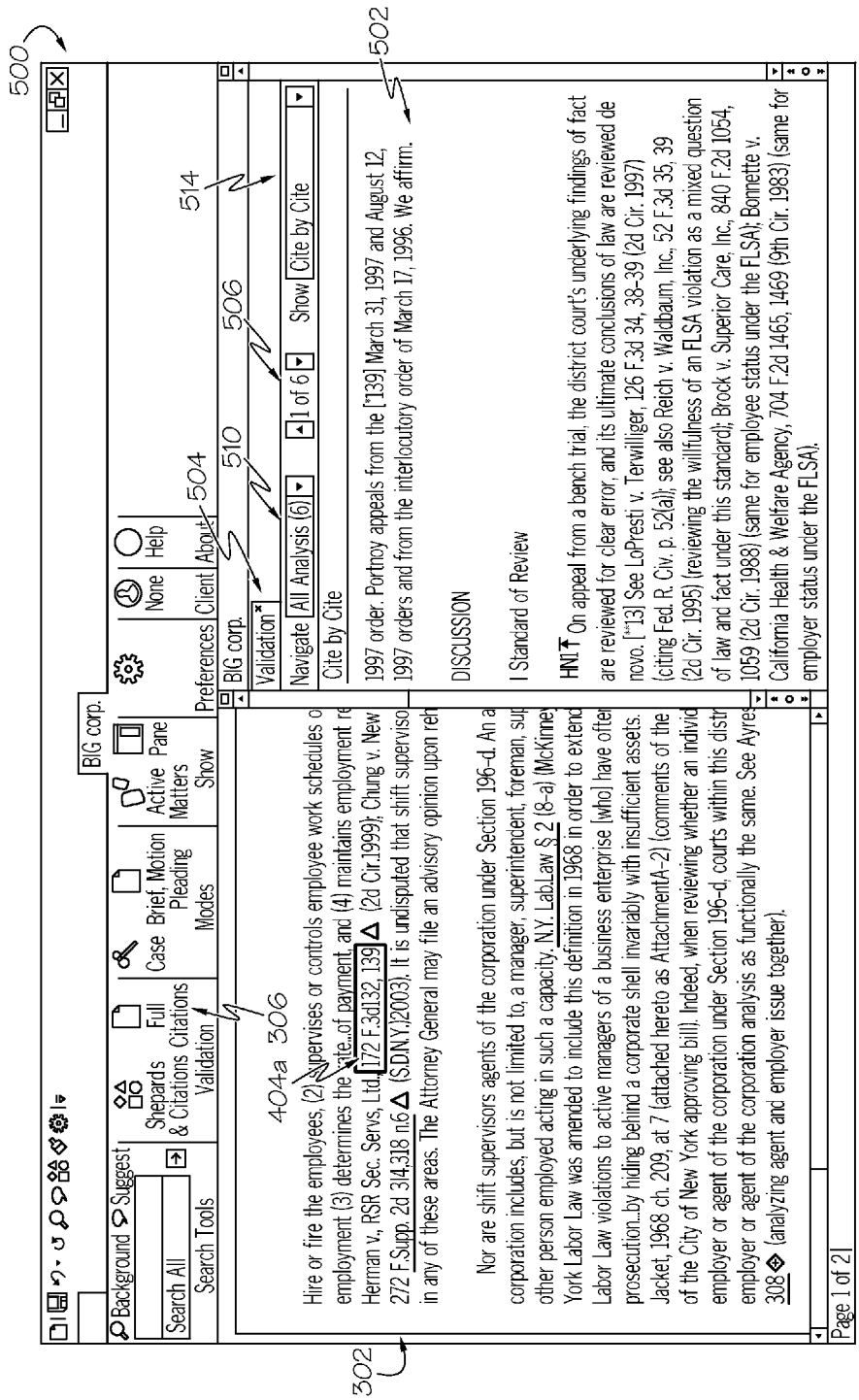
FIG. 5 depicts a dual window document interface that includes a document and a virtual document stack of corresponding data related to a term of interest from the document, according to embodiments shown and described herein.

FIG. 5 depicts a dual window document interface 500 that includes the document 302 and a virtual document stack 502 that are related to a term of interest from the document 302, according to embodiments shown and described herein. As illustrated, in response to selection of the pull citations option 306 (and/or selection of one of the citations 404) two windows 501a, 501b are provided. The first window 501a may include the document 302. The second window 501b may include a plurality of pieces of related data for the document. The related data may be formatted as the virtual document stack 502, which are the documents that correspond with the citations from the document 302 in the first window 501a. In the example from FIG. 5, the virtual document stack 502 includes court decisions identified in the citations 404 from the first window 501a. As the user scrolls down the document 302 in the first window 501a, the virtual document stack 502 in the second window 501b may change to display the legal opinion of the citation that is currently displayed in the first window 501a. Similarly, if the user changes the display of the second window 501b, such as by selecting option 506, the view of the document 302 may be adjusted to the section of the document 302 where that legal opinion is cited.

Also included in the example of FIG. 5 are at least one menu tab 504, and at least one sub-menu option 510. The menu tab 504 may identify a current search and/or selection, while the at least one sub-menu option 510 may identify categories of documents that may be provided under that menu tab 504. Similarly, a format option 514 may be utilized to change display of the virtual document stack 502 in the second window 501b. As illustrated, the format option 514 is currently selected to be "cite-by-cite," as described in more detail, below.

It should be understood that in some embodiments, a user may first select the citation option 304 to identify the words that correspond with terms of interest and then select the pull citations option 306 to create the virtual document stack 502. However, some embodiments may provide that by simply selecting the pull citations option 306, the citation option 304 is automatically activated, thus reducing the number of user actions to provide the virtual document stack 502.

Figure 6:
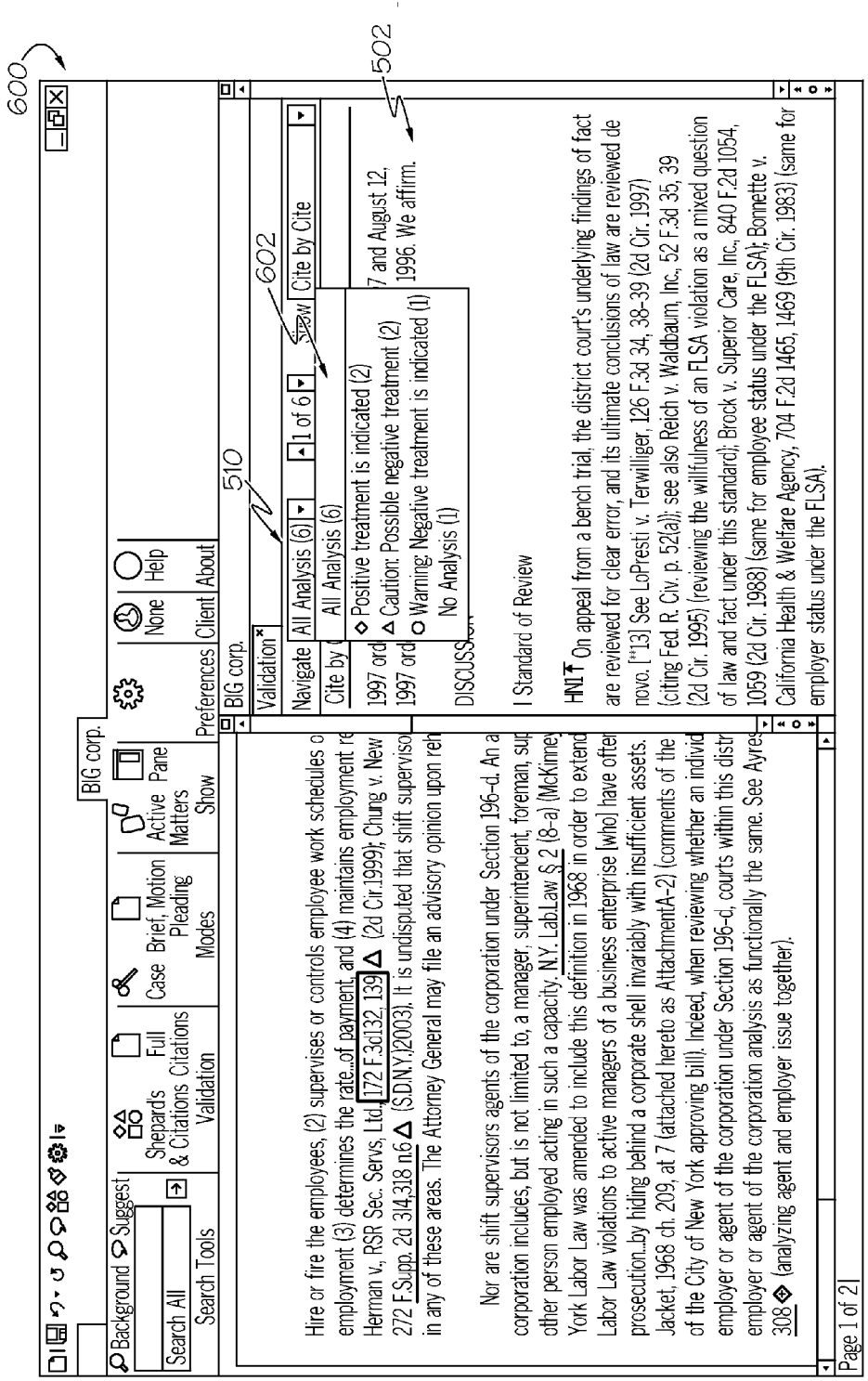
FIG. 6 depicts a dual window document interface that provides a filtering option to filter the virtual document stack, according to embodiments shown and described herein.

FIG. 6 depicts a dual window document interface 600 that provides a filtering option dropdown menu 602 to filter the virtual document stack 502, according to embodiments shown and described herein. As illustrated, under the menu sub-option 510 is the filtering option dropdown menu 602. By accessing the filtering option dropdown menu 602, the user may be provided with a plurality of options by which to filter the virtual document stack 502 in the second window 501b. As an example, the filtering option dropdown menu 602 in FIG. 6 illustrates that the virtual document stack 502 may be filtered based on those court decisions that have received a negative treatment; those that have been questioned; those that have been cautioned; those that have been given a positive treatment; and/or those with no analysis. By selecting one of the options the virtual document stack 502 may be filtered accordingly.

Figure 7:
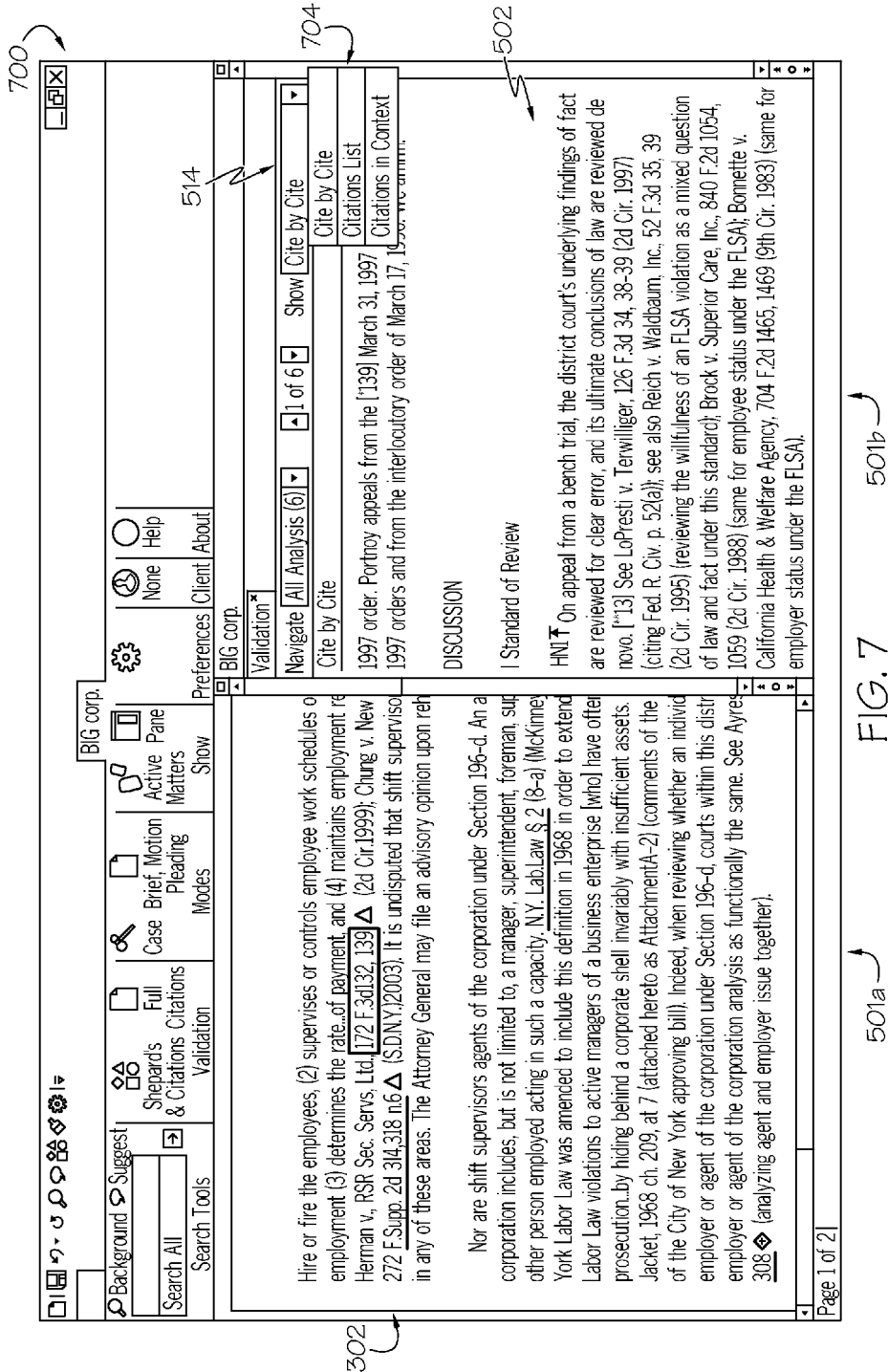
FIG. 7 depicts a dual window document interface that includes a format option for providing the virtual document stack in any of a plurality of different formats, according to embodiments shown and described herein.

FIG. 7 depicts a dual window document interface 700 that includes the format option 514 for providing the virtual document stack in any of a plurality of different formats, according to embodiments shown and described herein. As illustrated, a citations list option 704 is currently selected, which corresponds to a format for providing the virtual document stack 502. Other formats include "cite-by-cite" and "citations in context." The citations in context option 704 not only provides the citation, but also provides text from that legal document. More specifically, some embodiments provide a predetermined number of characters in the legal opinion that are in the vicinity of the citation that was selected from the document 302 in the first window 501a. The text retrieved from the legal document may be determined from an analysis of the quoted sections in the document 302 and/or from the pages listed in the citation. Regardless, the quoted section, as well as a predetermined amount of text around the quoted section may be provided in the second window 501b.

FIG. 8 depicts a dual window document interface 800 that includes the format option 514, with the citations list option 804 selected, according to embodiments shown and described herein. As illustrated, by selecting the citations list option 804 in the format option 514, the citations from the first window 501a may be listed, without substantial additional information in the second window 50 lb. Such a view provides the user with a quick list of all citations in the document 302.

Figure 9:
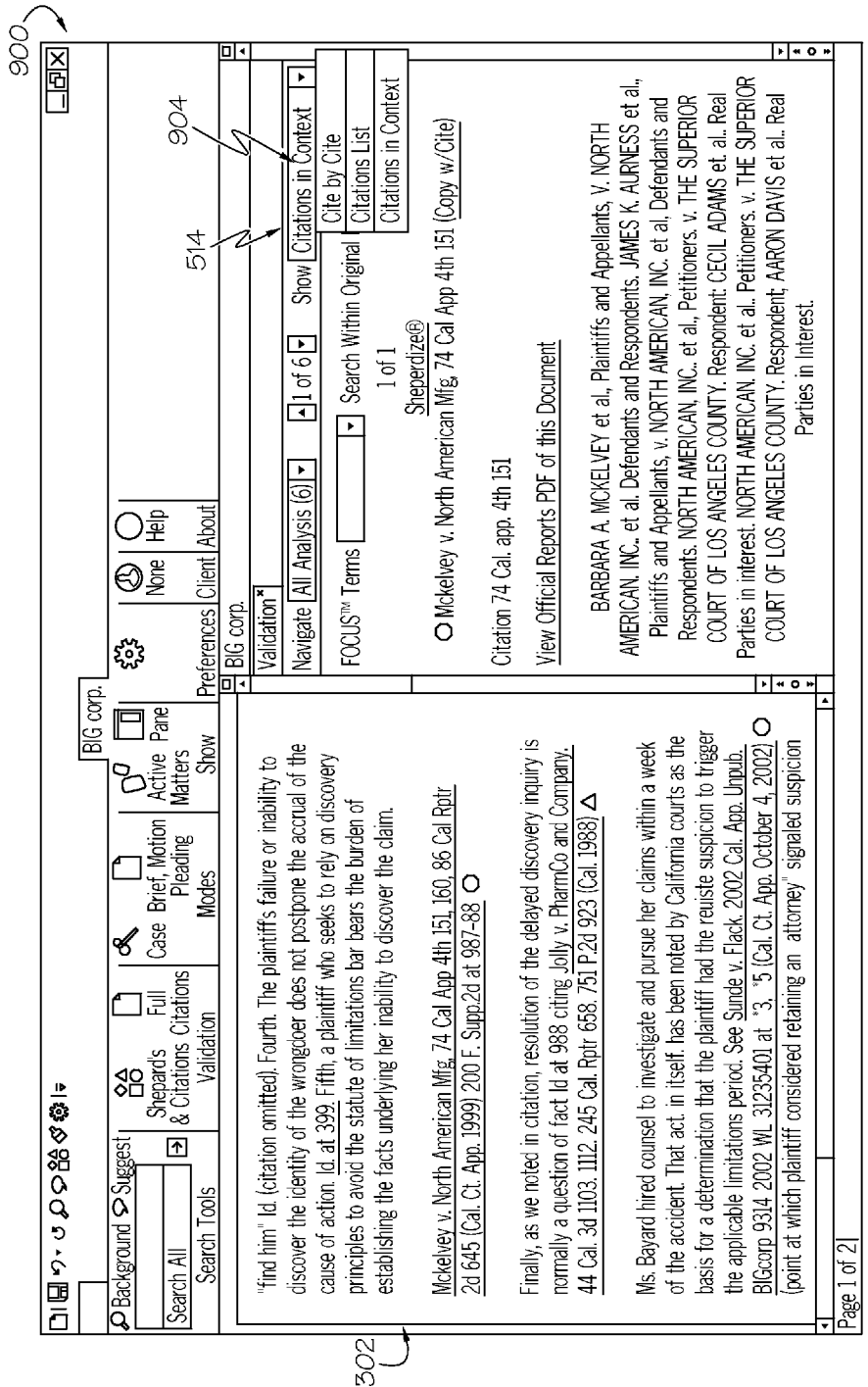
FIG. 9 depicts a dual window document interface that includes citations in context associated with a term of interest, according to embodiments shown and described herein.

FIG. 9 depicts a dual window document interface 900 that includes the format option 514, with the citations in context option 904 selected, according to embodiments shown and described herein. As illustrated, the citations in context option 904 provides the full legal opinion in the second window 501b that is associated with the selected citation from the document 302 in the first window 501a.

Figure 10:
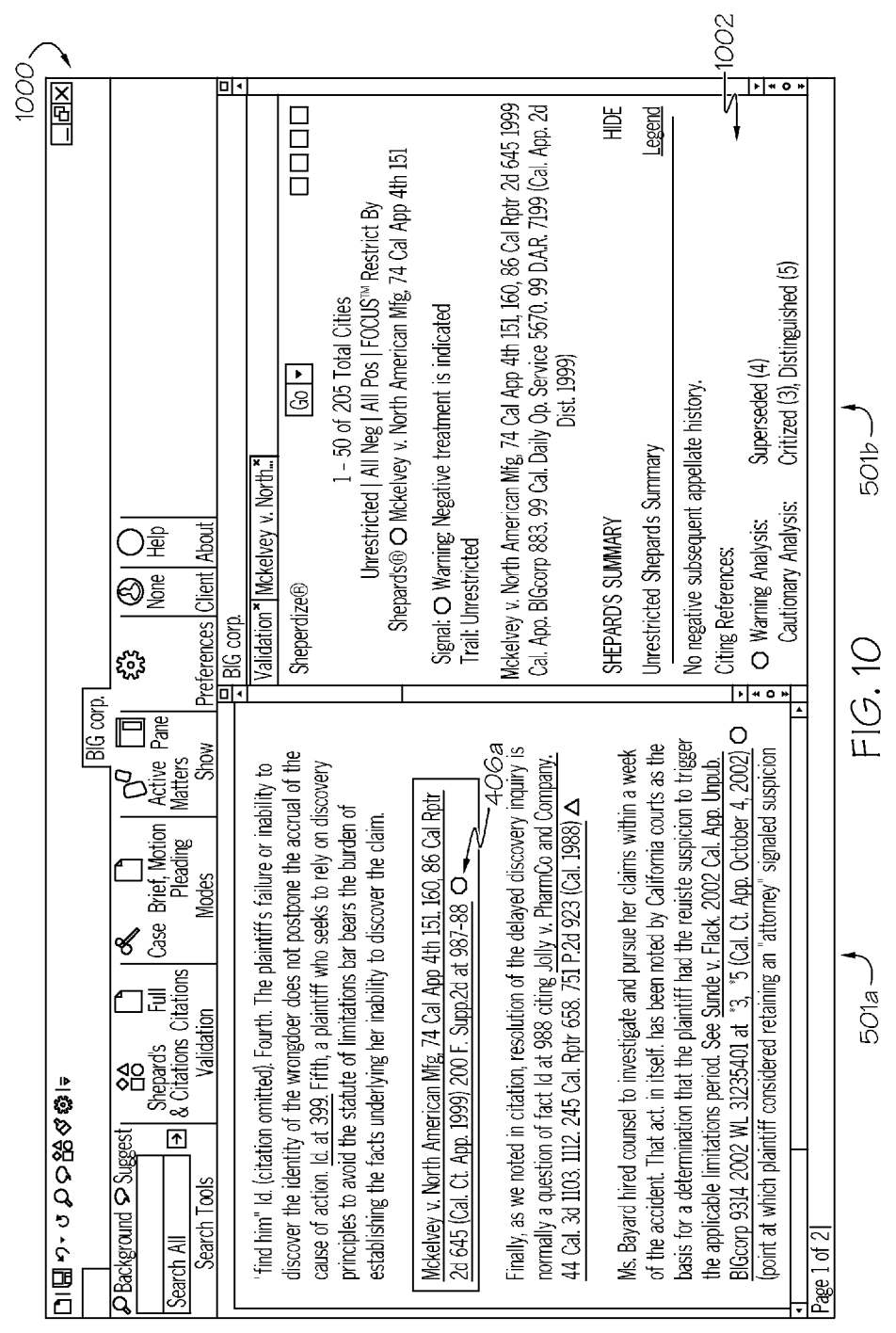

FIG. 10 depicts a dual window document interface 1000 that includes information related to the validly of a citation, according to embodiments shown and described herein. As illustrated, in response to selection of the validity signifier 406a in the first window 501a, a validity document 1002 may be provided in the second window 50 lb. The validity document 1002 may be accessed from the online research tool and/or provided via other mechanisms.

Figure 11:
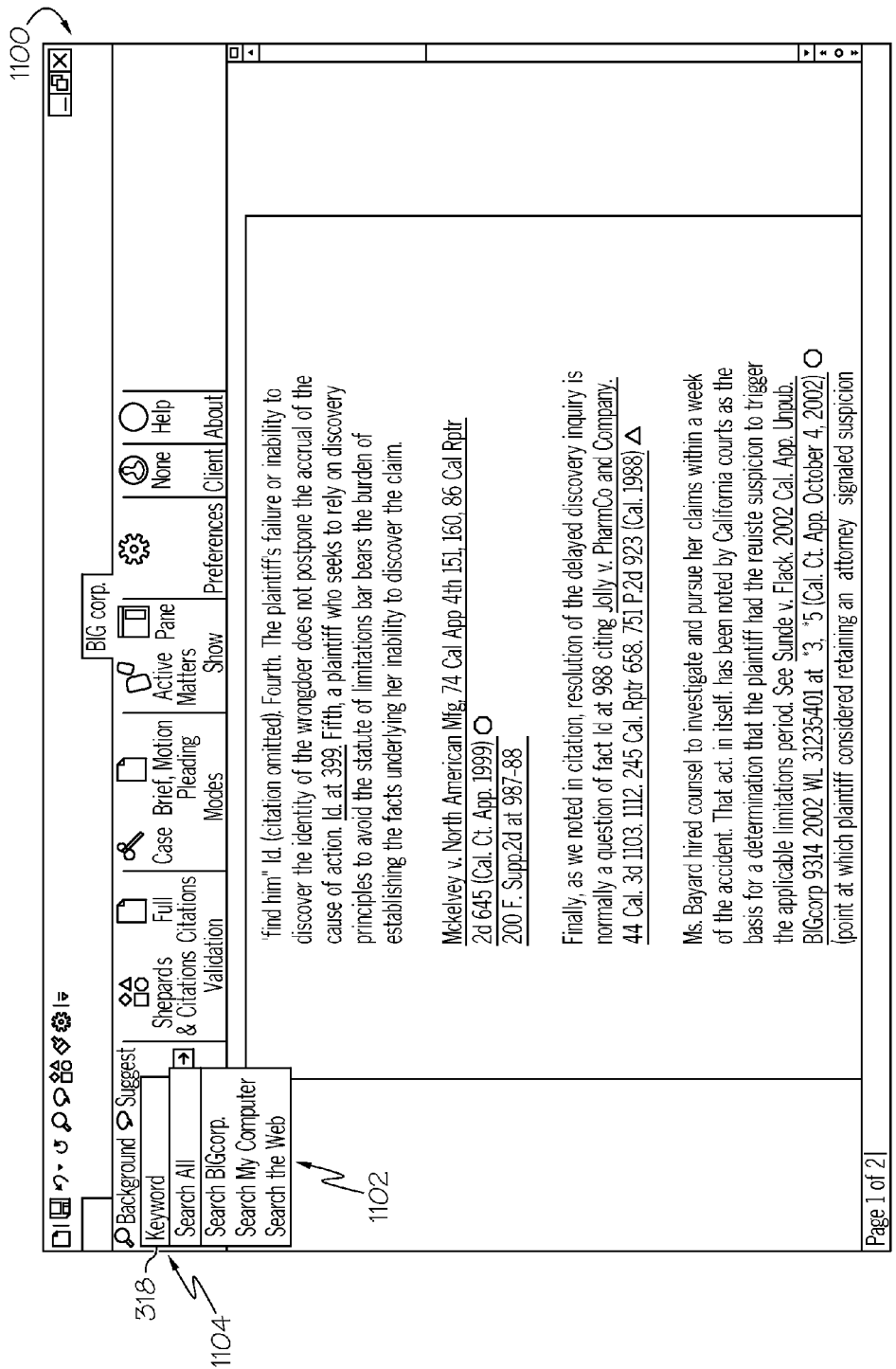
FIG. 11 depicts a document interface that includes a keyword search function, according to embodiments shown and described herein.

FIG. 11 depicts a document interface 1100 that includes the keyword search option 318, according to embodiments shown and described herein. As illustrated, the keyword search option 318 may provide a dropdown menu 1102 that includes a plurality of sources for searching a keyword. The parameters of the keyword search option 318 include searching all sources, searching an online search tool, searching a local area network, searching the local computing device 102a, and searching the internet. Other options may also be provided. Additionally, the user can input the keyword in the prompt area 1104 to facilitate the search.

Figure 12:
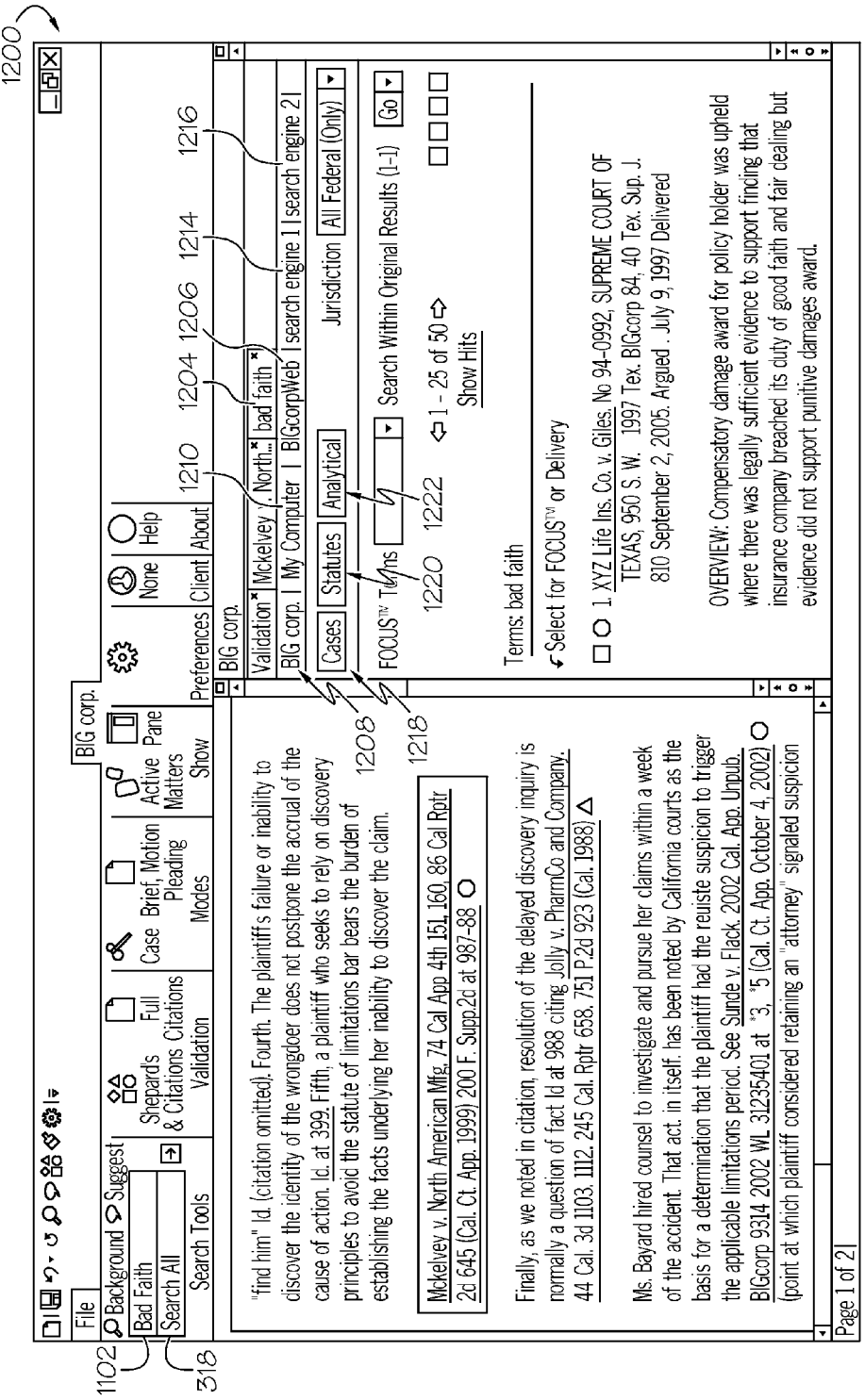
FIG. 12 depicts a dual window document interface that includes search results from a plurality of sources, according to embodiments shown and described herein.

FIG. 12 depicts a dual window document interface 1200 that includes search results from a plurality of sources, according to embodiments shown and described herein. As illustrated, by searching the phrase "bad faith" in the keyword search option 318 and selecting "search all" from the dropdown menu 1102, the user may be provided with the search results under a "bad faith" tab 1204 in the second window 501b. Additionally, because all available sources were searched, the second window 501b includes tabs 1206, 1208, 1210, 1214, and 1216, which correspond with each of the sources that were searched. More specifically, the tab 1206 corresponds to results received from the online research tool. The tab 1208 corresponds to results retrieved from computers that are a part of the local area network. The tab 1210 corresponds to results retrieved from the local computing device 102a. Additionally, the tabs 1214, and 1216 correspond to results retrieved from various internet searches. Also included in the interface 1200 are sub-tabs that correspond with the tab 1206. The results retrieved from the online research tool are further divided into a cases sub-tab 1218, a statutes sub-tab 1220, and an analytical sub-tab 1222. Other tabs and/or sub-tabs may also be provided.

It should be understood that while tabs 1204-1222 are utilized in FIG. 12 to organize search results, this is merely an example. In some embodiments, other organization mechanisms may be utilized, such as hyperlinks, windows, etc.

Figure 13:
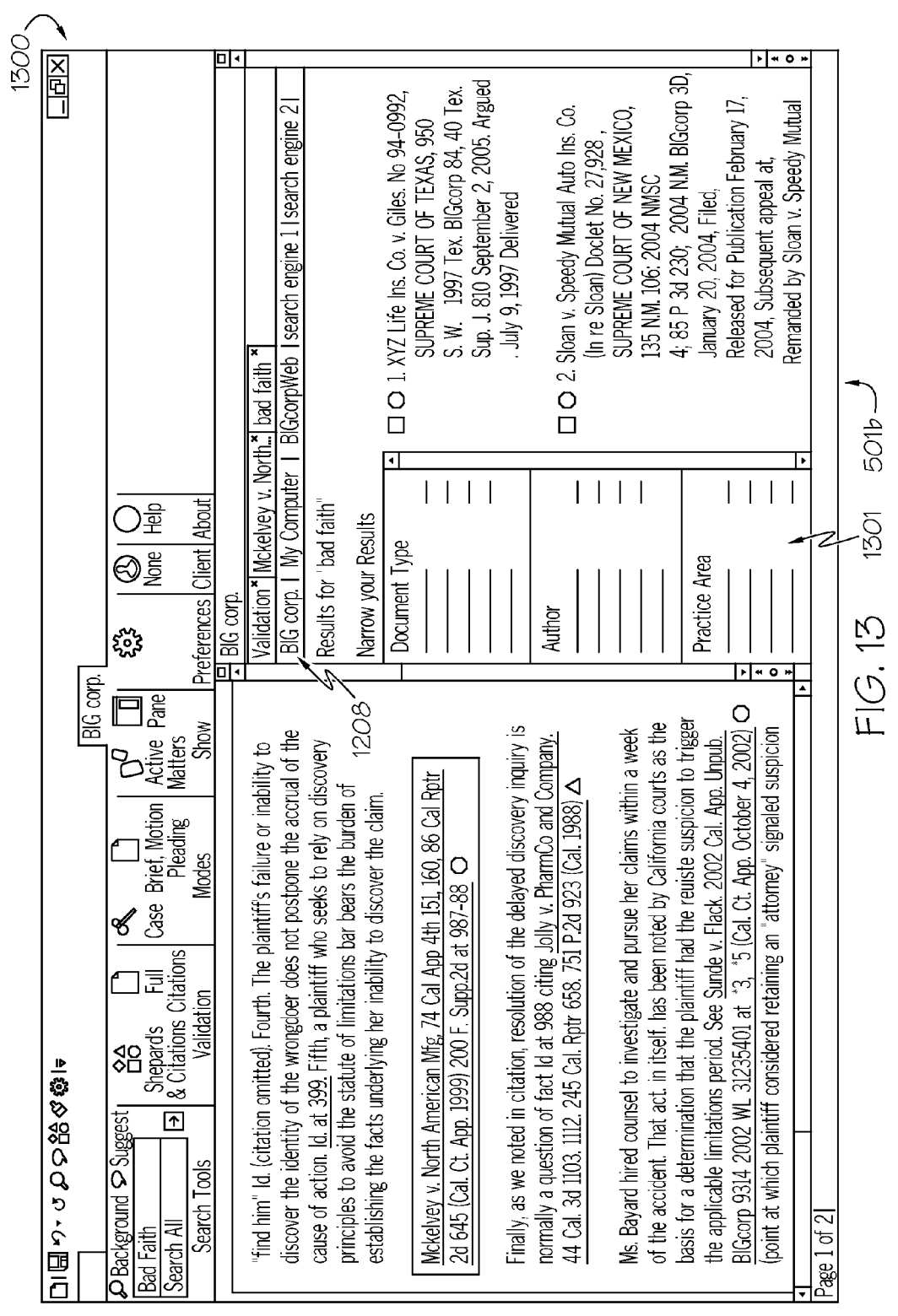

FIG. 13 depicts a window document interface 1300 that includes search results found on the local area network, according to embodiments shown and described herein. As illustrated, by selecting the tab 1208, documents that include the phrase "bad faith" from the local area network are provided in the second window 50 lb. Additionally, the results may be further organized and/or narrowed in a third window 1301, which includes a plurality of criteria by which the results are further organized and by which the user can further filter the search. Examples of the additional filtering in the third window 1301 include document type, author, practice area, client, matter, and document number.

Figure 14:
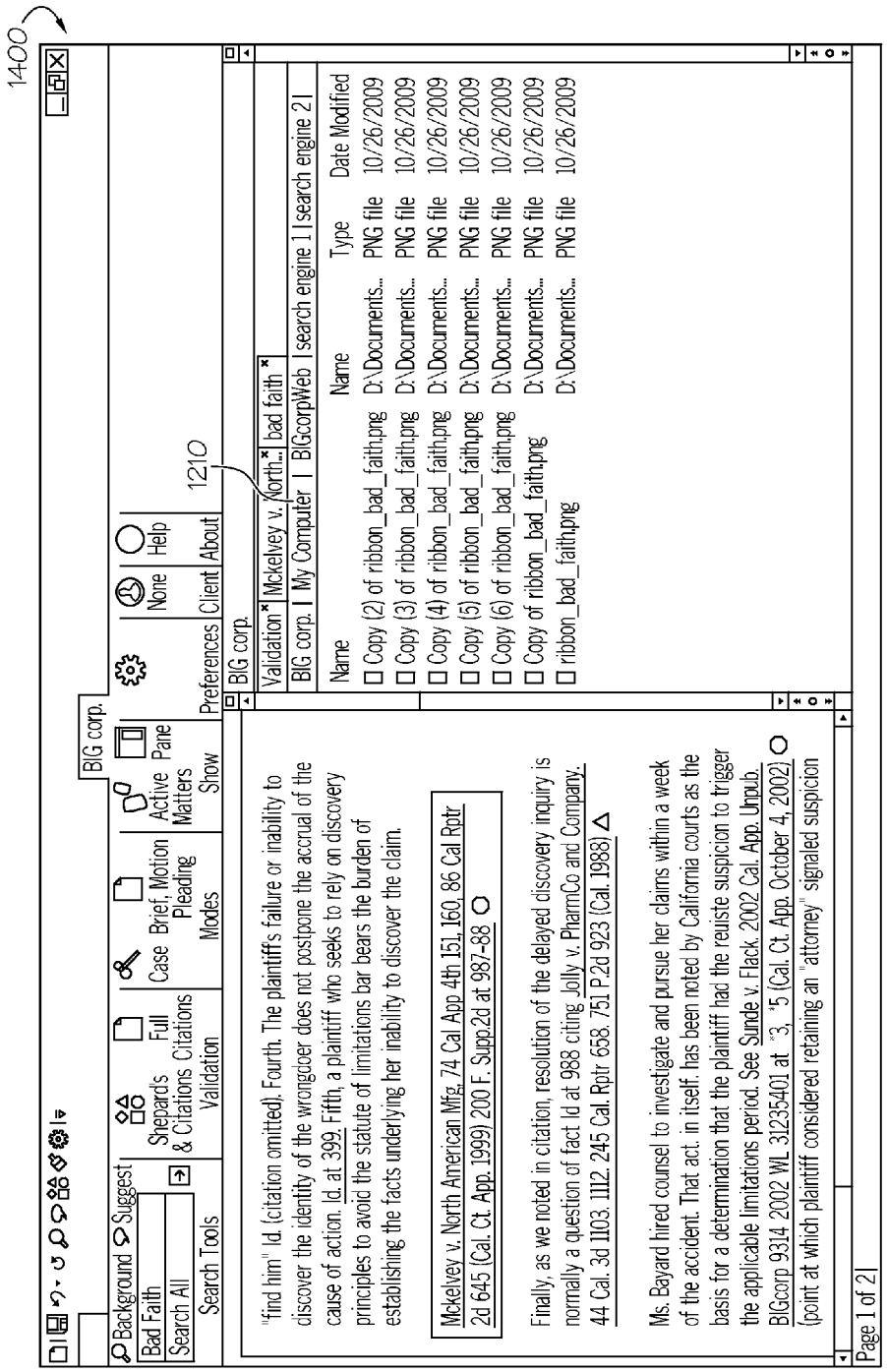
FIG. 14 depicts a dual window document interface that includes search results found locally, according to embodiments shown and described herein.

FIG. 14 depicts a dual window document interface 1400 that includes search results found on a local computing device, such as the local computing device 102a, according to embodiments shown and described herein. As illustrated, by selecting the tab 1210, the locally stored results may be provided in the second window 501b. Similarly, while not explicitly illustrated in FIG. 14, the search results that are stored locally may be further organized and/or filtered in a third window, as illustrated in FIG. 13.

Figure 15:
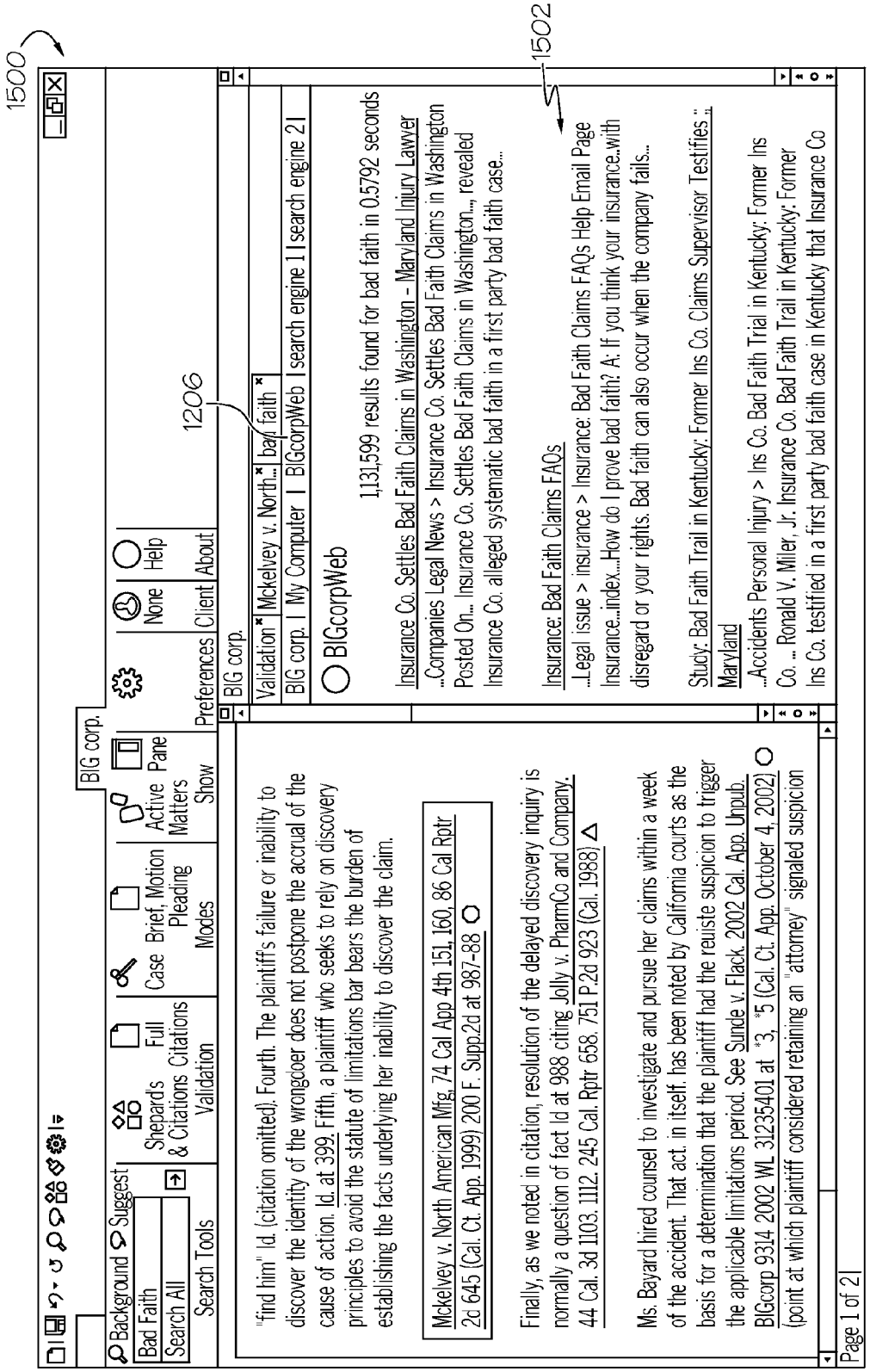
FIG. 15 depicts a dual window document interface that includes search results from an online research tool, according to embodiments shown and described herein.

FIG. 15 depicts a dual window document interface 1500 that includes search results from an online research tool, according to embodiments shown and described herein. As illustrated, by selecting the tab 1206, a web interface 1502 may be provided in the second window 501b. The web interface may include one or more search results as retrieved by the online research tool.

Figure 16:
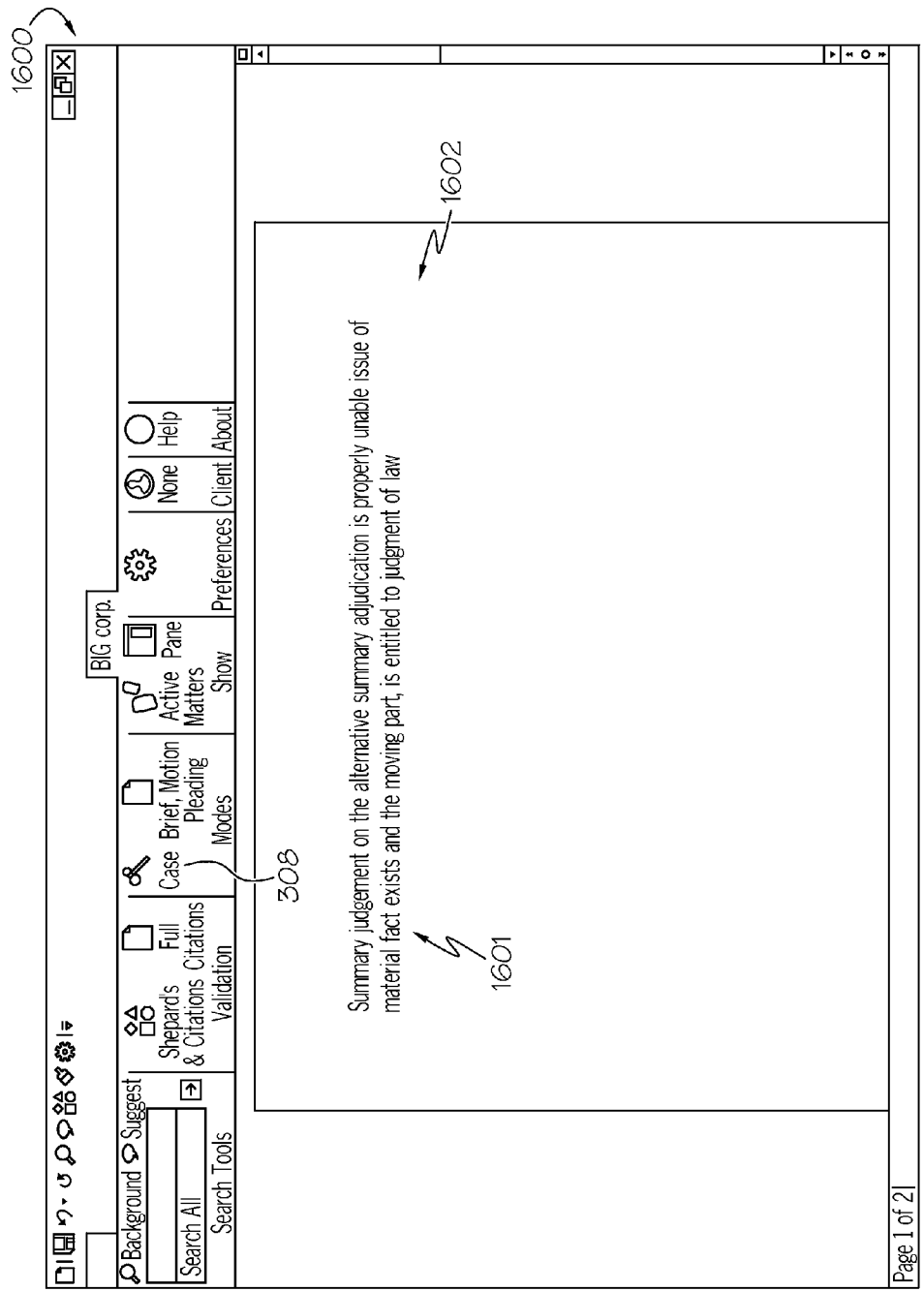
FIG. 16 depicts a document interface that includes a case mode option, according to embodiments shown and described herein.

FIG. 16 depicts a document interface 1600 that includes the case mode option 308, according to embodiments shown and described herein. As illustrated, a user may provide a text string 1601 in a new document 1602. Upon entering the text string 1601, a case law search of the text string may be performed in response to the user selecting the case mode option 308. Similarly, in some embodiments, a user may simply select or place a cursor around a predetermined portion of text in a document to only search the selected text (and/or a predetermined number of characters around the cursor position). Additionally, while the case mode may be available via the case mode option 308, other mechanisms may be utilized for this functionality. As an example, in some embodiments, the user may "right click" a portion of text and access a case mode option via a pop-up option window.

Figure 17:
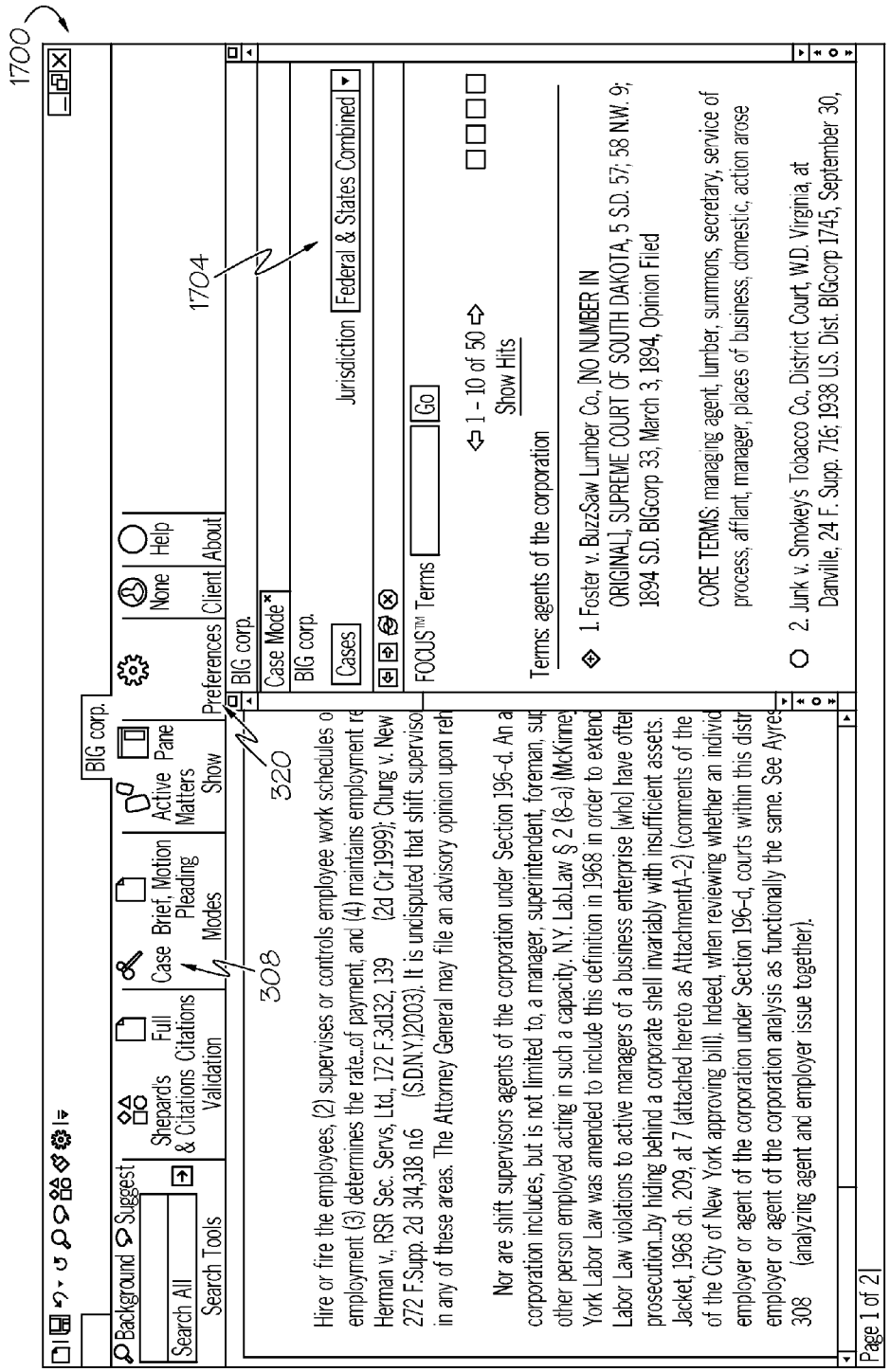
FIG. 17 depicts a dual window document interface including results from selection of the case mode option, according to embodiments shown and described herein.

FIG. 17 depicts a dual window document interface 1700 including results provided from selection of the case mode option 308, according to embodiments shown and described herein. As illustrated, the results from FIG. 16 may be provided, along with a jurisdiction option 1704. The jurisdiction option 1704 may be provided for a user to select a desired jurisdiction for the search. If the search is performed in an undesirable jurisdiction, the user can change the jurisdiction in the jurisdiction option 1704 and the search may be performed again. The default jurisdiction may be selected by the user via the preferences option 320 and/or determined from an account registered with the online research tool. In some embodiments, the validation tool logic 144c may cause the local computing device 102a to automatically determine a jurisdiction from the text of the new document 1602 and/or other locally stored data. As an example, the new document 1602 may explicitly list a jurisdiction and/or provide a judge name, court name, address, and/or other data from which a jurisdiction may be determined.

Figure 18:
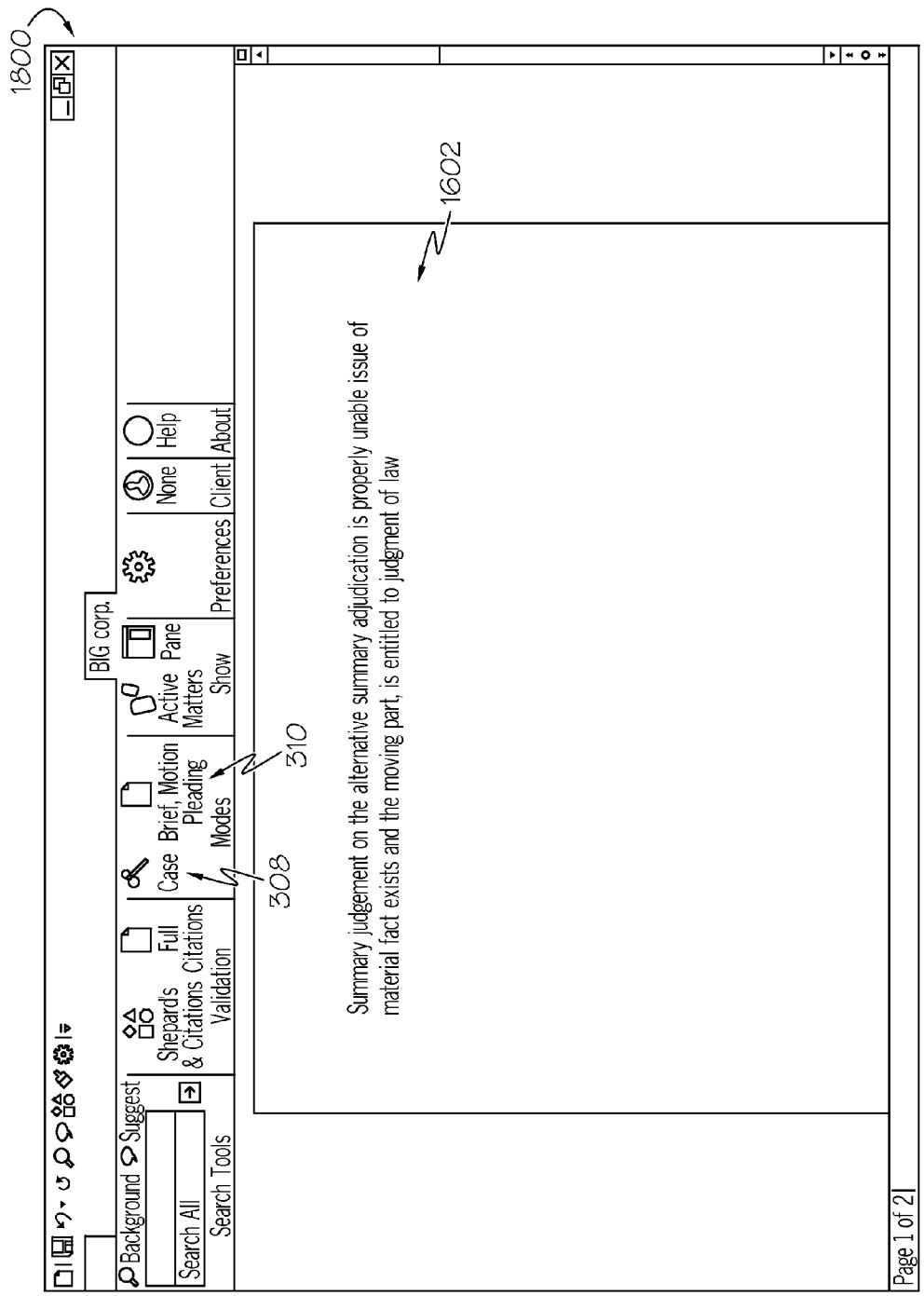
FIG. 18 depicts a document interface including a brief, motion, pleading mode option, according to embodiments shown and described herein.

FIG. 18 depicts a document interface 1800 including the brief, motion, pleading mode option 310, according to embodiments shown and described herein. As illustrated, the user can provide a text string in the new document 1602 and, by selecting the brief, motion, pleading mode option 310, a search may be performed of briefs, motions, pleadings, and/or related documents. While the case mode option 308 provides search results of case law, selection of the brief, motion, pleading mode option 310 provides results that include attorney documents that are (or may be) filed with a court. Again, depending on a predetermined user preference and/or selection, the search in FIGS. 17 and/or 18 may be performed from the online research tool, the local area network, the local computing device 102*a*, the internet, and/or from other sources.

Figure 19:
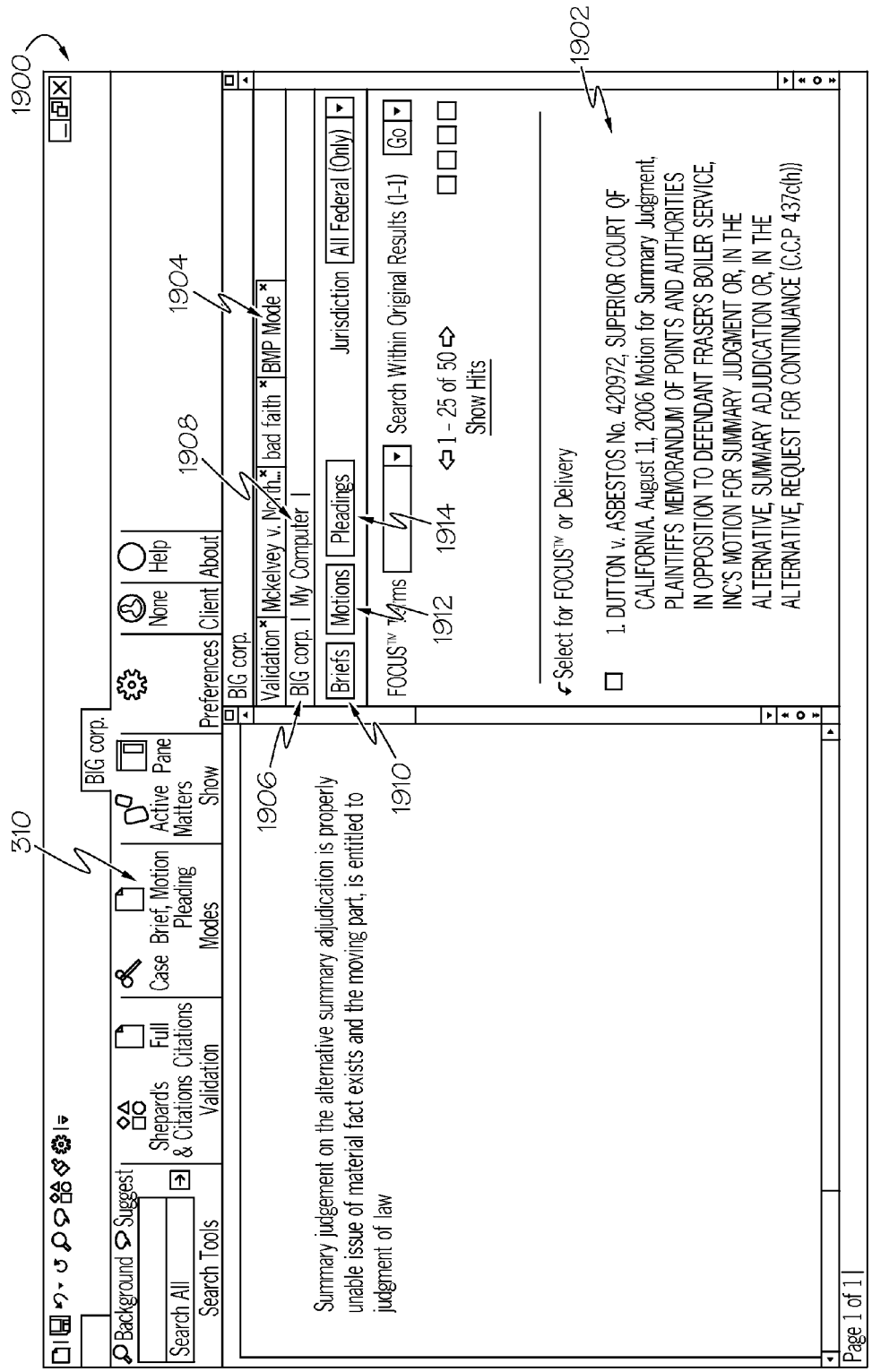
FIG. 19 depicts a dual window document interface including results from selection of the brief, motion, pleading mode option, according to embodiments shown and described herein.

FIG. 19 depicts a dual window document interface 1900 including results from selection of the brief, motion, pleading mode option 310, according to embodiments shown and described herein. As illustrated, in response to selection of the brief, motion, pleading mode option 310, a virtual document stack 1902 may be provided in the second window 501*b*, under a newly created tab 1904. Additionally, in sub-tabs 1906 and 1908, the sources that are searched may be provided, such that the user can differentiate results, based on the source of information. Second level sub-tabs 1910, 1912, and 1914 are also provided to differentiate documents by whether the documents are briefs, motions, or pleadings.

It should be understood that while the above described embodiments refer to the validation tool logic 144*c* being executed with the document logic 144*a*, these are merely examples. More specifically, functionality described may also apply to the communicator logic 144*b*. Similarly, the functionality described with regard to FIGS. 20-30 may also apply to the document logic 144*a*.

Figure 20:
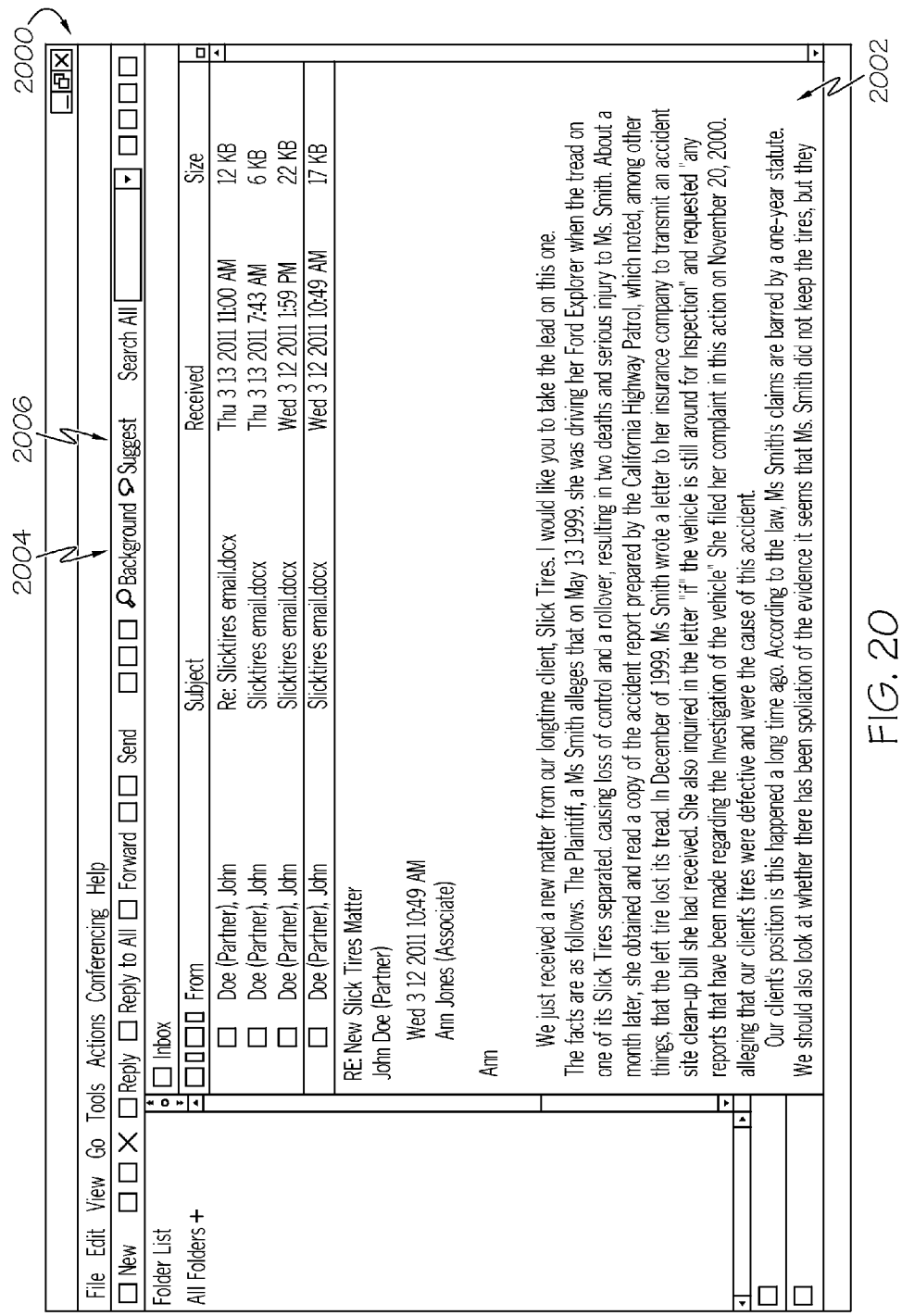
FIG. 20 depicts a communicator interface including a background option and a suggest option, according to embodiments shown and described herein.

FIG. 20 depicts a communicator interface 2000 including a background option 2004 and a suggest option 2006, according to embodiments shown and described herein. As illustrated, an email message 2002 (or other communication message) may be received and/or composed by a user at the local computing device 102*a*. The email message 2002 may include one or more words that potentially correspond to a term of interest, such as a legal term, legal citation, entity name, person name, address, etc. Accordingly, by selecting the background option 2004, the validation tool logic 144*c* can cause the local computing device 102*a* to analyze the text of the email message 2002 to determine which of the words in the email message 2002 actually correspond to a term of interest. Similarly, the user can select a portion of text in the email message 2002 and select the suggest option 2006 to facilitate a determination of whether the selected word and/or words are terms of interest, as described in more detail below.

Figure 21:
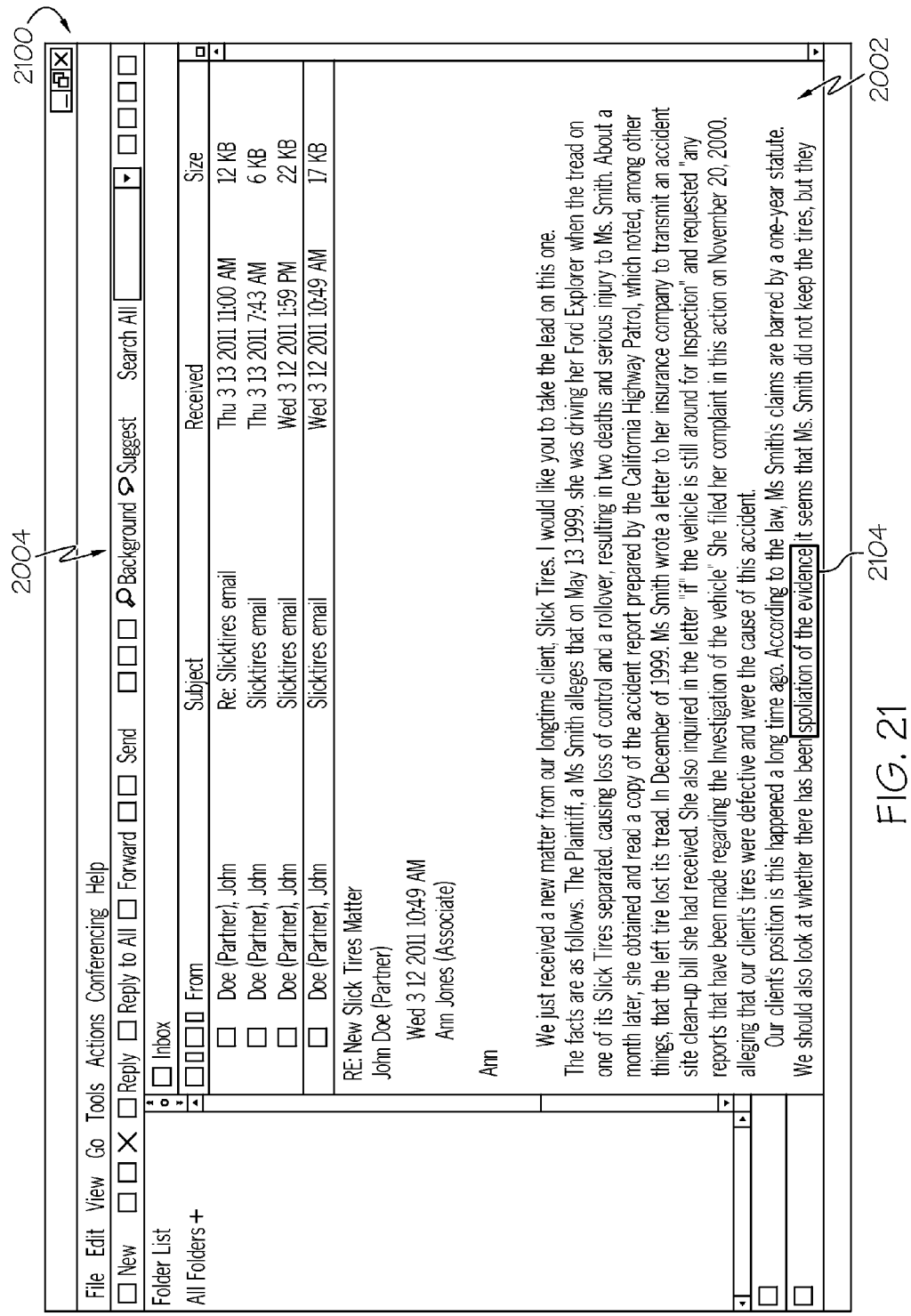
FIG. 21 depicts a communicator interface including highlighted terms of interest, in response to selection of the background option, according to embodiments shown and described herein.

FIG. 21 depicts a communicator interface 2100 including highlighted words 2104, in response to selection of the background option 2004, according to embodiments shown and described herein. As illustrated, in response to selection of the background option 2004, the email message 2002 may be analyzed to determine whether any of the words and/or phrases corresponds with terms of interest. This determination may be made by comparing the words of the email message 2002 with data in a local and/or remote data repository (such as the remote data storage 102*c*) that includes a plurality of terms of interest. If one or more of the words from the email message 2002 correspond to a term of interest in the data repository, information regarding that term of interest may be accessed and the email message 2002 may be altered to highlight those words 2104. As indicated above, by highlighting the word in the email message 2002, the local computing device 102*a* may alter the display of the word in any manner that differs from the rest of the email message. In some embodiments, this includes a text color change, a background color change, inclusion of a hyperlink, providing an outline around the word, etc.

Figure 22:
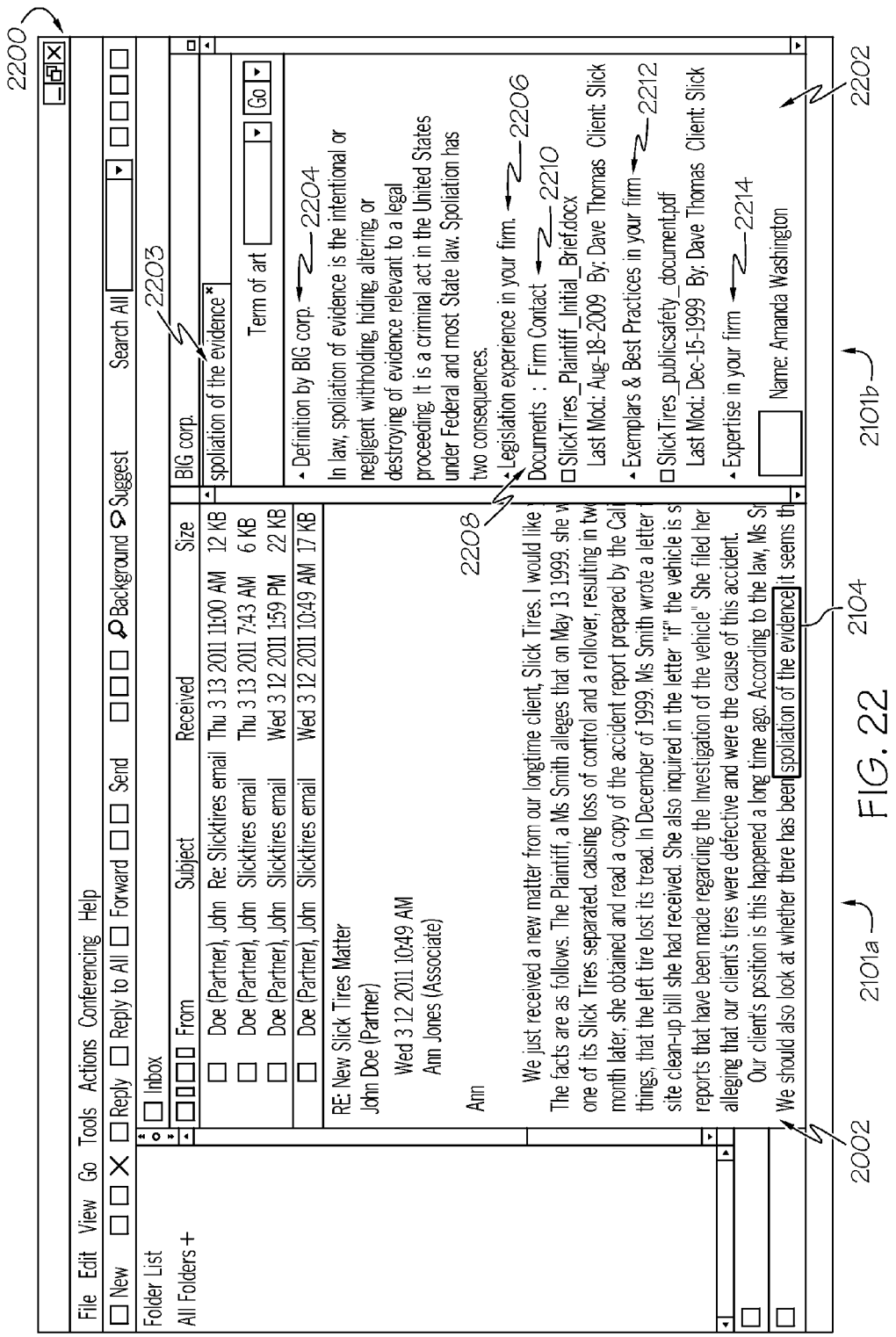
FIG. 22 depicts a dual window communicator interface including data related to a selected term of interest, according to embodiments shown and described herein.

FIG. 22 depicts a dual window communicator interface 2200 including data related to a selected word associated with a term of interest, according to embodiments shown and described herein. As illustrated, the words that correspond with terms of interest are highlighted. Additionally, in response to selection of the phrase "spoliation of evidence" 2104, the local computing device 102*a* causes the email message 2002 to be provided in a first window 2101*a* and term of interest data 2202 in a second window 2010*b*. The term of interest data 2202 may be listed under a first term of interest tab 2203 and may include a definition 2204, litigation experience in your firm 2206 (which may be further organized according to documents 2208 and firm contacts 2210), exemplars and best practices in your firm 2212, and expertise in your firm 2214.

As an example, the definition 2204 may be retrieved from the online research tool. The litigation experience in your firm 2206 may be retrieved from the local area network. The exemplars and best practices in your firm 2212 may be retrieved from the local area network. The expertise in your firm 2214 may be retrieved from the local area network. Additional term of interest data 2202 may include seminal cases, statutes, treatises, etc. that include the term of interest and/or internet search results, such as from a search engine.

Figure 23:
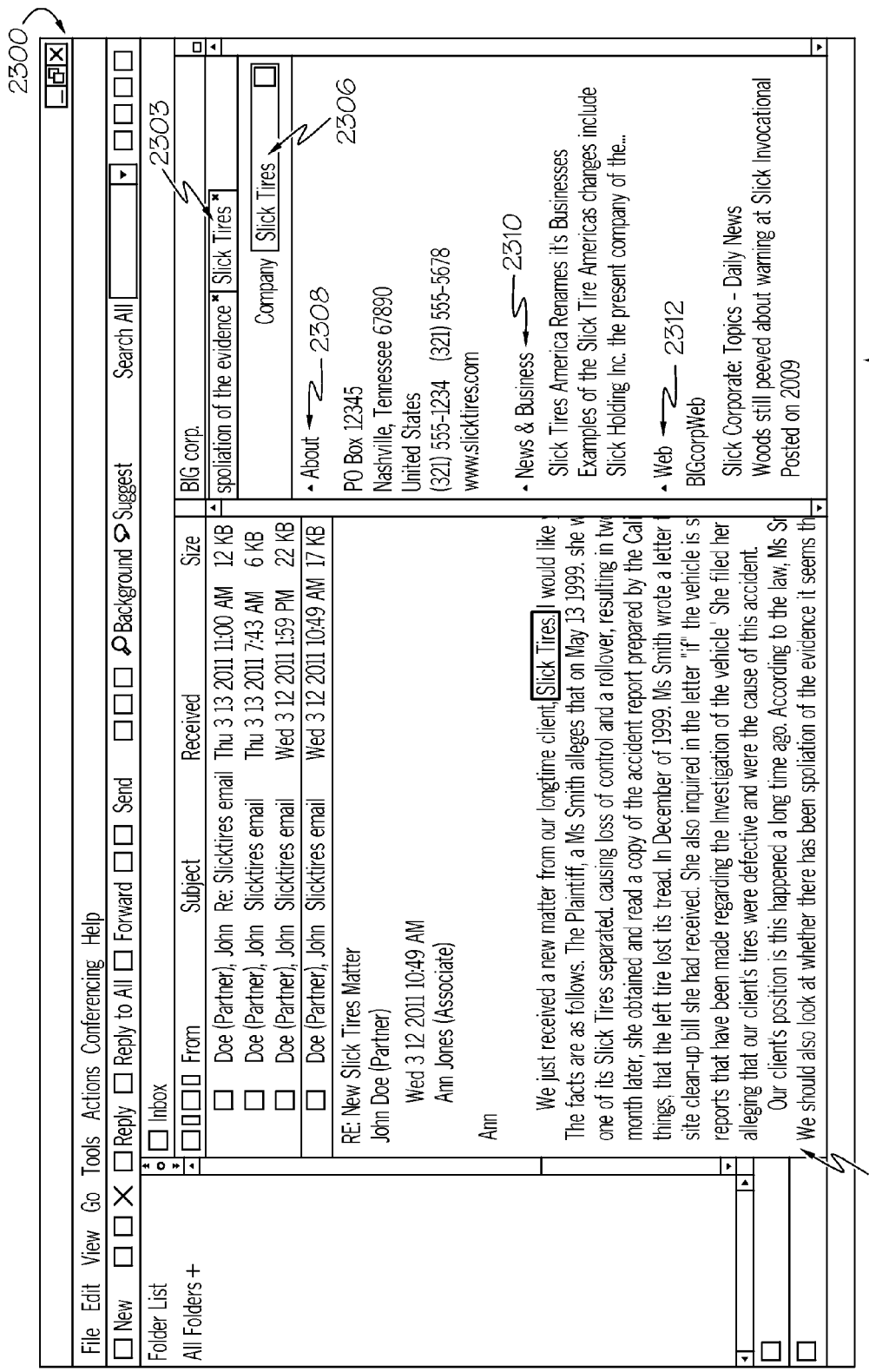
FIG. 23 depicts a dual window communicator interface including data related to a business term of interest, according to embodiments shown and described herein.

FIG. 23 depicts a dual window communicator interface 2300 including data related to a business term of interest, according to embodiments shown and described herein. As illustrated, in response to selection of the phrase "Slick Tires," which has previously been identified as being related to a term of interest, the second window 2010*b* can include a second term of interest tab 2303 that provides information regarding the company "Slick Tires." The information may include general information 2308, news and business 2310, internet search results 2312, and/or other data. Also included is a company dropdown menu 2306. The company dropdown menu 2306 provides a user option to quickly locate similar information on other businesses referenced in the email message 2002.

Figure 24:
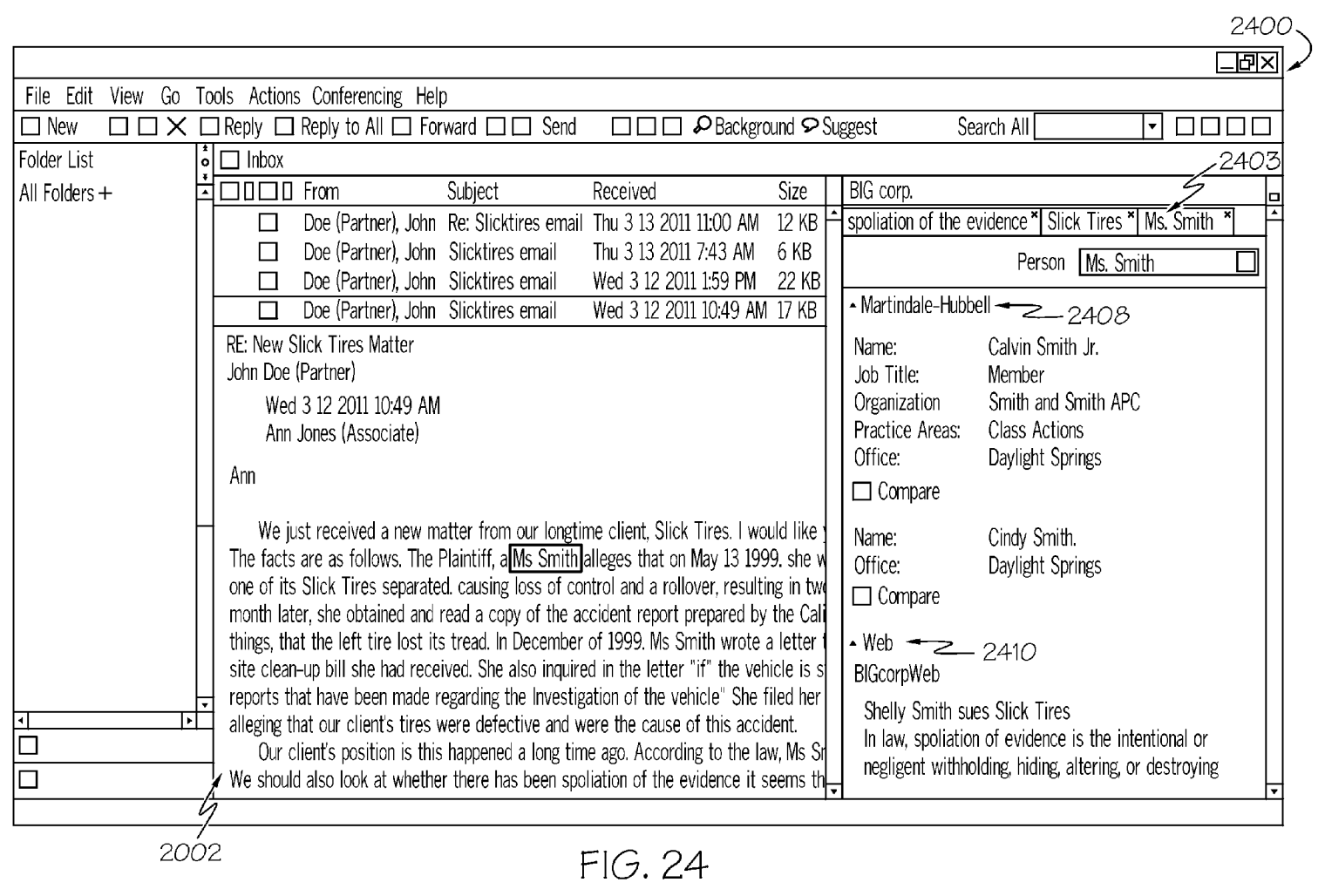

FIG. 24 depicts a dual window communicator interface 2400 including a personal term of interest, according to embodiments shown and described herein. As illustrated, the phrase "Mr. Smith" was determined to be associated with a term of interest. In response to a user selection of this phrase, the validation tool logic 144*c* causes the local computing device 102*a* to provide a third term of interest tab 2403 associated with "Mr. Smith." As the phrase "Mr. Smith" is determined to be a person, a second determination may be made regarding whether "Mr. Smith" is an attorney, Judge, and/or other legal professional. This determination can be made from other information within the email message 2002. If it can be determined from the email message 2002 that "Mr. Smith" is likely a legal professional, the local computing device 102*a* can facilitate a legal professional search (such as through Martindale-Hubbell™ and/or the local area network). If Mr. Smith is not a legal professional (or if it cannot be determined from the email message 2002), a general person search may be performed. Additionally, other searches may be performed (such as an internet search) to determine relevant information regarding "Mr. Smith." The search results may be organized under a professional search category 2408, an internet search category 2410, and/or under another category.

It will also be understood that in many circumstances, a person search may return multiple people with a common name. In such situations, information from the email message 2002 may be utilized to determine which "Mr. Smith" is the correct "Mr. Smith" and thus filter the results. Other information may also be utilized for this purpose, such as a locally stored contact list, a contact list stored on the local area network, previous emails that include "Mr. Smith," and/or other information. As an example, if multiple "Ms. Fayards" are located in a search, a determination of additional information (such as an address, telephone number, etc.) may be retrieved from a contact list, the email message, etc. This information may then be compared with similar information related to the "Mr. Smiths" found in the search to filter the results.

Figure 25:
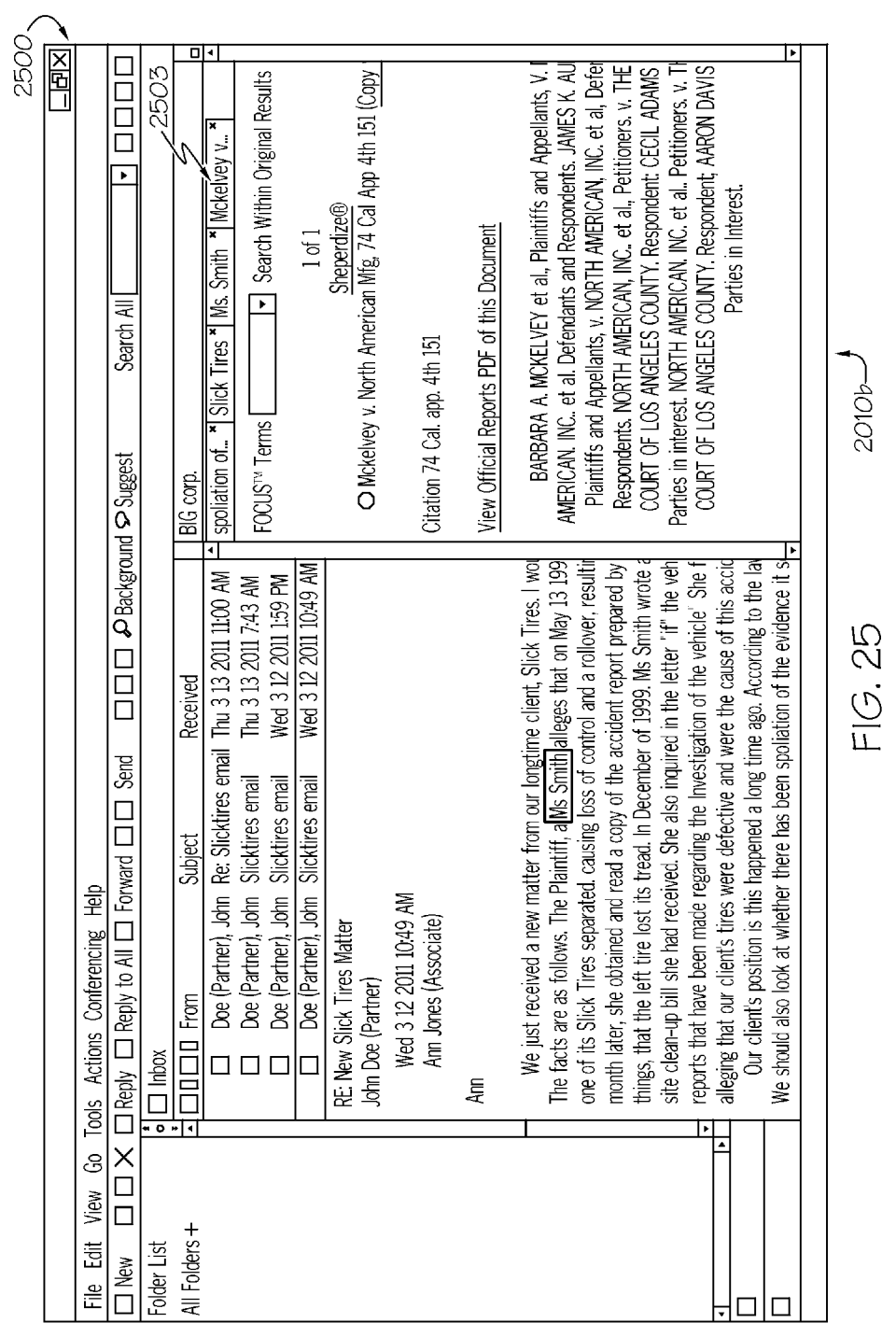

FIG. 25 depicts a dual window communicator interface 2500 including a citation term of interest, according to embodiments shown and described herein. As illustrated, the phrase "McNeil v. Econ Laboratories, Inc." was determined to be associated with a term of interest and selected by a user. Additionally, in the second window 2010*b*, a fourth term of interest tab 2503 may be provided and include the legal document that corresponds with the citation. Under the fourth term of interest tab 2503, the legal opinion that corresponds with the citation may be provided. Additionally information may also be included, such as validity information, as discussed above.

Figure 26:
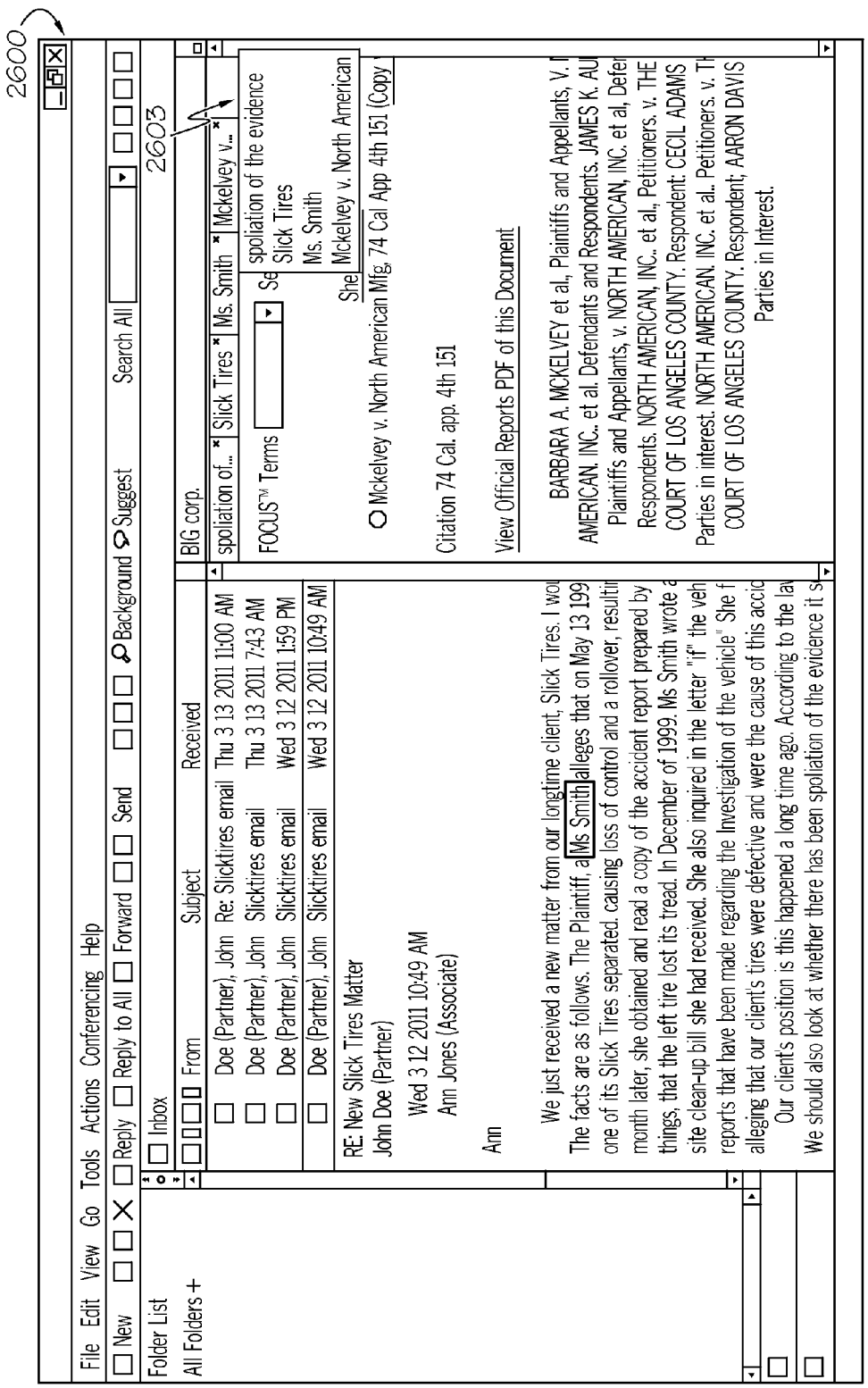
FIG. 26 depicts a dual window communicator interface including a menu for selecting a previously identified term of interest, according to embodiments shown and described herein.

FIG. 26 depicts a dual window communicator interface 2600 including a dropdown menu 2603 for selecting a previously identified term of interest, according to embodiments shown and described herein. As illustrated, in addition to the fourth term of interest tab, the dropdown menu 2603 may also be provided to indicate other terms of interest that have been selected. This can provide easy access to previously searched terms of interest.

Figure 27:
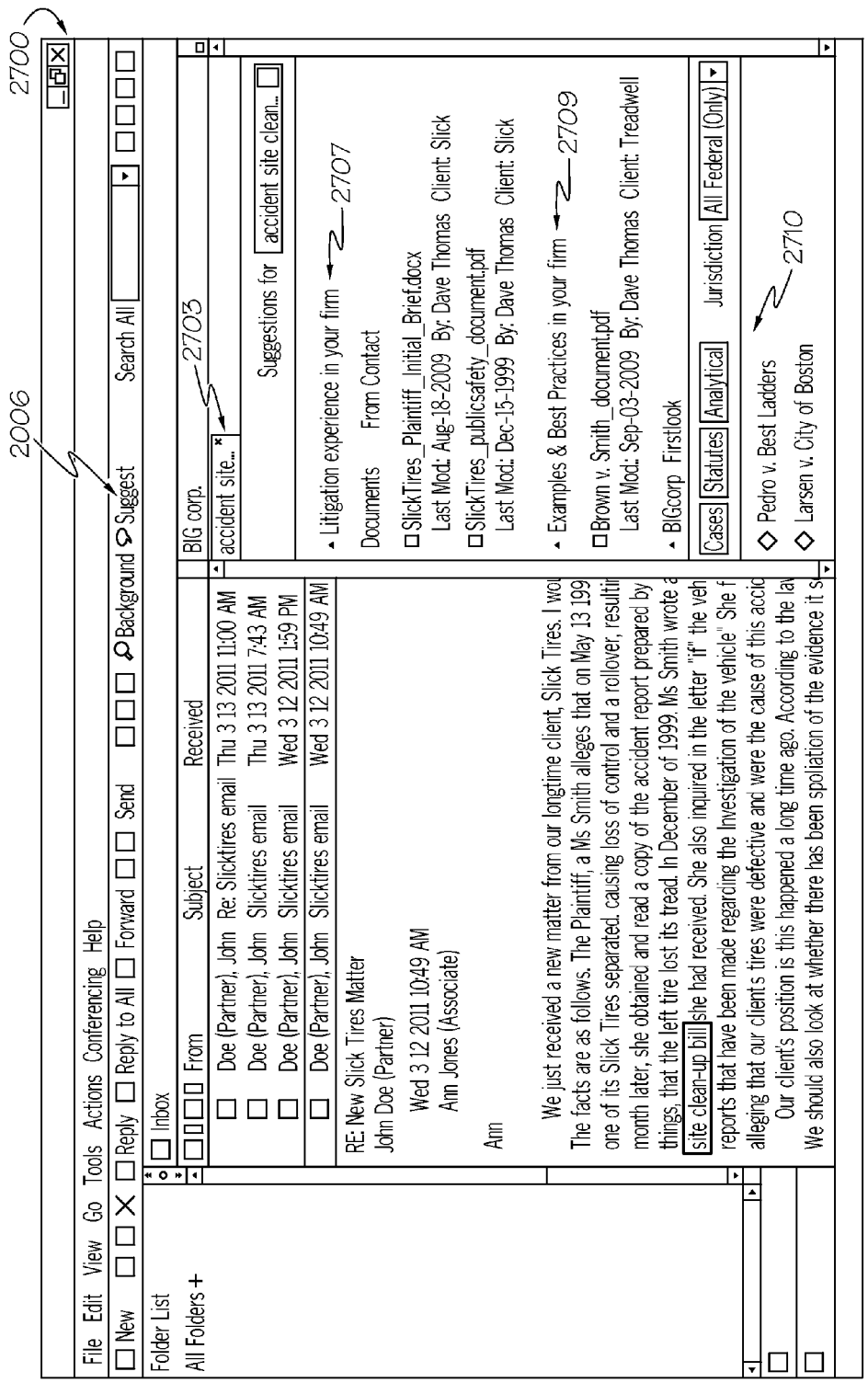
FIG. 27 depicts a dual window communicator interface including data provided in response to selection of the suggest option, according to embodiments shown and described herein.

FIG. 27 depicts a dual window communicator interface 2700 including data provided in response to selection of the suggest option, according to embodiments shown and described herein. As illustrated, the user manually highlighted the phrase "site clean-up bill" and selected the suggest option 2006. In response, the validation tool logic 144*c* can cause the local computing device 102*a* to perform a search for the selected phrase. The search may access the local computing device 102*a*, the local area network, an internet search engine, and/or other sources. The results from the search may be provided in the second window 2101*b* and may be organized according to litigation experience in your firm 2707, exemplars and best practices in your firm 2709, and cases, statutes, and treatises 2710. Results may also be organized according to internet searches.

Figure 28:
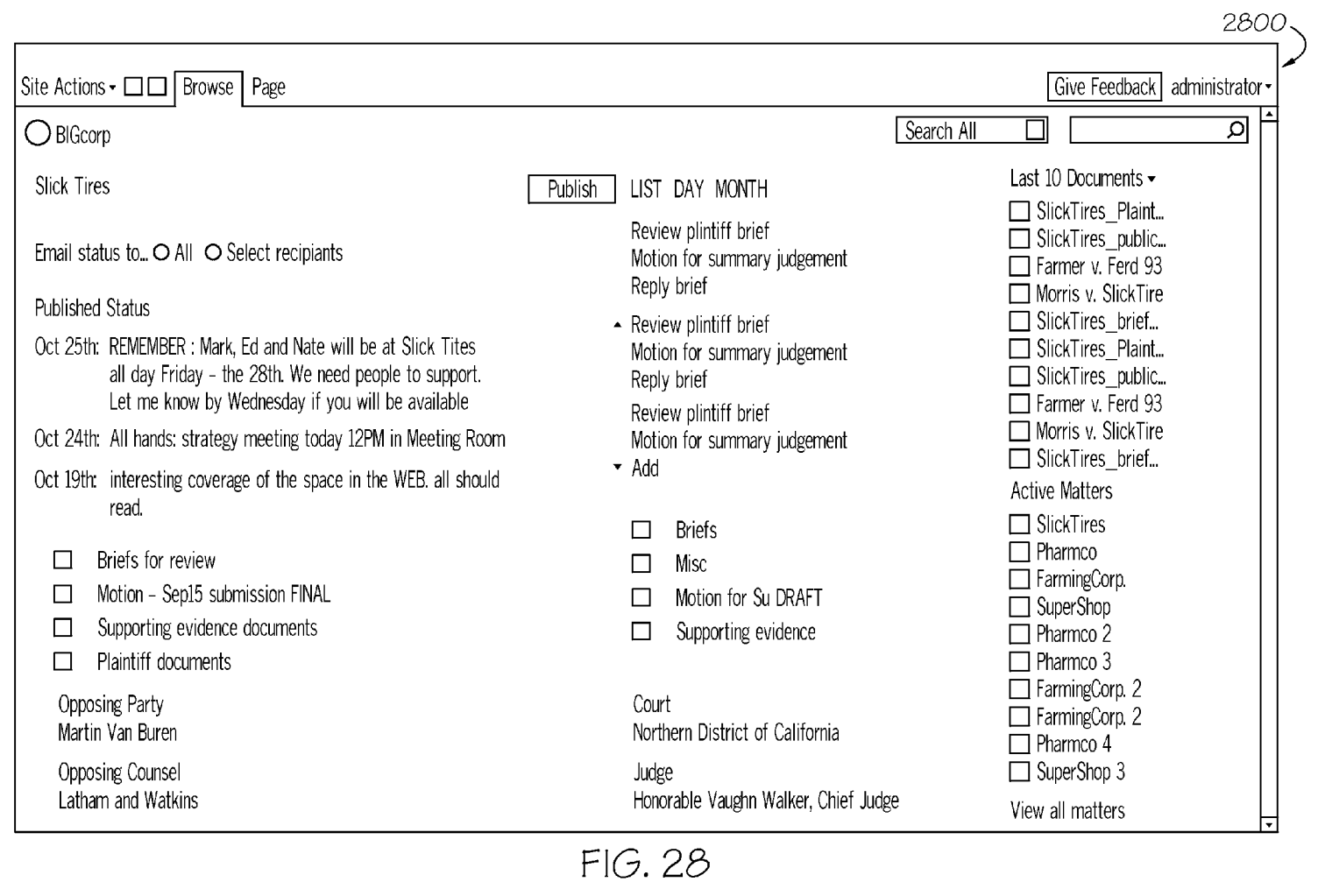

FIG. 28 depicts a matter management interface 2800 for providing matter status of a matter to which a user is authorized, according to embodiments shown and described herein. As illustrated, in response to selection of the active matters option 312 (e.g., FIG. 3), the matter management interface 2800 may be provided. The matter management interface 2800 may be configured to access documents on the local area network and organize those documents according to whether they correspond with a common legal matter. Information regarding the legal matter may be provided, such as current status, opposing party data, opposing counsel data, court data, judge data, calendar data, etc. Additionally, access to published documents (published by an authorized user of the legal matter) may be provided. Similarly, documents that a user has created (published and/or unpublished) may also be provided to that user. The matter management interface 2800 may also provide links to other active matters to which the user has authorization, as well as the last 10 documents, emails, etc. that the user has accessed.

Also included are options for including calendar entries from the matter into the user's electronic calendar and vice versa. As an example, the user can send an electronic "meeting request" to a predetermined address to publish the event on the matter management interface. By so doing, the other authorized persons on the legal matter may also receive the meeting request and/or a new calendar entry that corresponds with that event. Similarly, if the event is entered (and/or automatically retrieved) into the matter management interface 2800, the event may then be sent to the authorized users as a calendar entry and/or meeting request.

Figure 29:
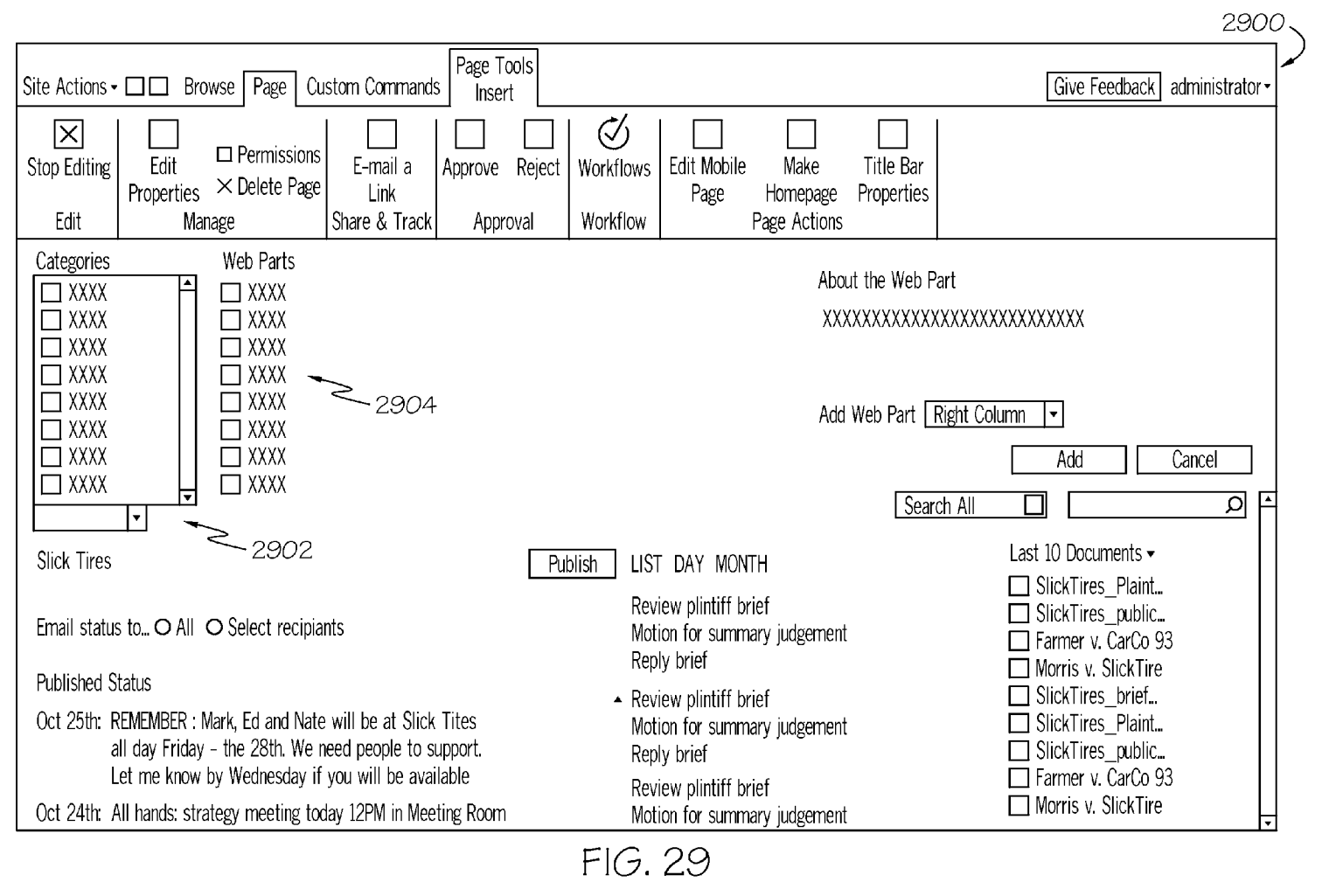

FIG. 29 depicts a matter management interface 2900 that further includes page tools, according to embodiments shown and described herein. As illustrated, in addition to the options provided in the matter management interface 2800 from FIG. 28, categories 2902 and web parts 2904 may also be provided for user access. The categories may include types of legal documents, and/or other categories. The web parts 2904 may include access to matter status, case calendar, master document, other documents, other information, jurisdiction and judge information, last 5 documents and searches, active matters, etc.

It should be understood that while the background option 2004 and the suggest option 2006 are discussed in FIGS. 20-27, this is merely an example. More specifically, the background option 314 and the suggest 316 (e.g., FIG. 3) may be configured to provide similar functionality for a stationary document.

Figure 30:
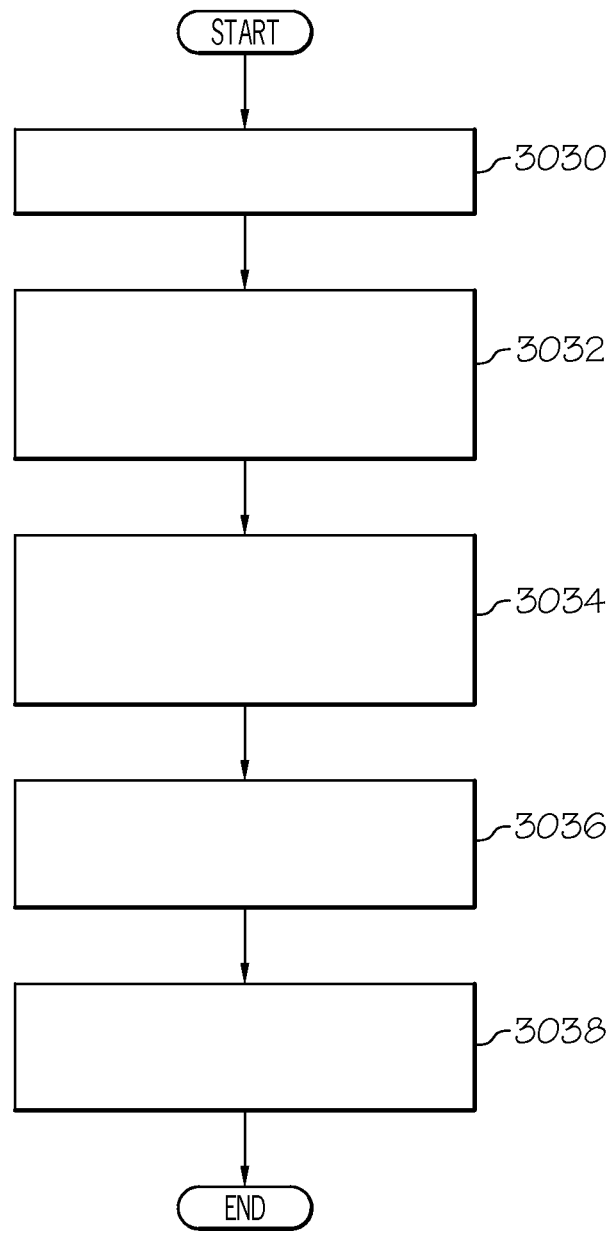
FIG. 30 depicts a process for providing a validation tool that includes incorporating a link into a document, according to embodiments shown and described herein.

FIG. 30 depicts a process for providing a validation tool that includes incorporating a link into a document, according to embodiments shown and described herein. As illustrated in block 3030, a word may be identified within a document. At block 3032, a determination may be made from a predetermined list that includes a term of interest, whether the word matches the term of interest. At block 3034, the word may be highlighted in response to determining that the word matches the term. At block 3036, related data that corresponds with the term of interest may be accessed. At block 3038, the word may be replaced with a link to the related data.

Figure 31:
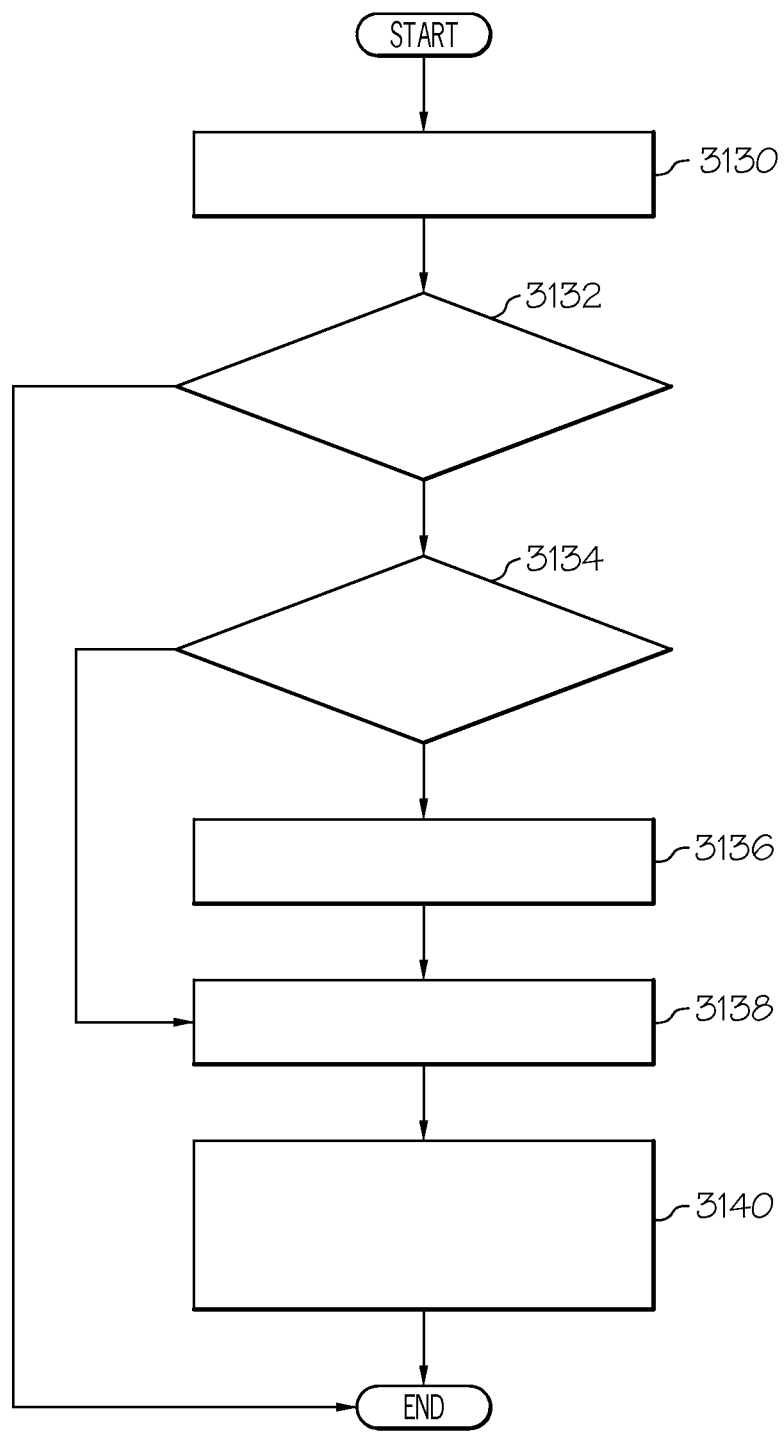
FIG. 31 depicts a process for providing a validation tool that determines inaccuracies in a document, according to embodiments shown and described herein.

FIG. 31 depicts a process for providing a validation tool that determines inaccuracies in a document, according to embodiments shown and described herein. As illustrated at block 3130, a user selection of the citation option may be received. At block 3132, a determination can be made regard whether any words are potential terms of interest. If not, the process may end. If at block 3132, there is at least one word that is a potential term of interest, at block 3134 a determination can be made regarding whether there are any inaccuracies in the potential term of interest. As an example, if the term of interest is a legal citation, a determination may be made regarding whether the citation includes any errors. If so, at block 3136, corrective measures may be taken, as discussed above. If there are no inaccuracies and/or after the inaccuracies are corrected, at block 3138, the validity of the potential term of interest may be identified. At block 3140, the words that are formatted as a potential term of interest and provide indicator for the validity of the potential term of interest.

Figure 32:
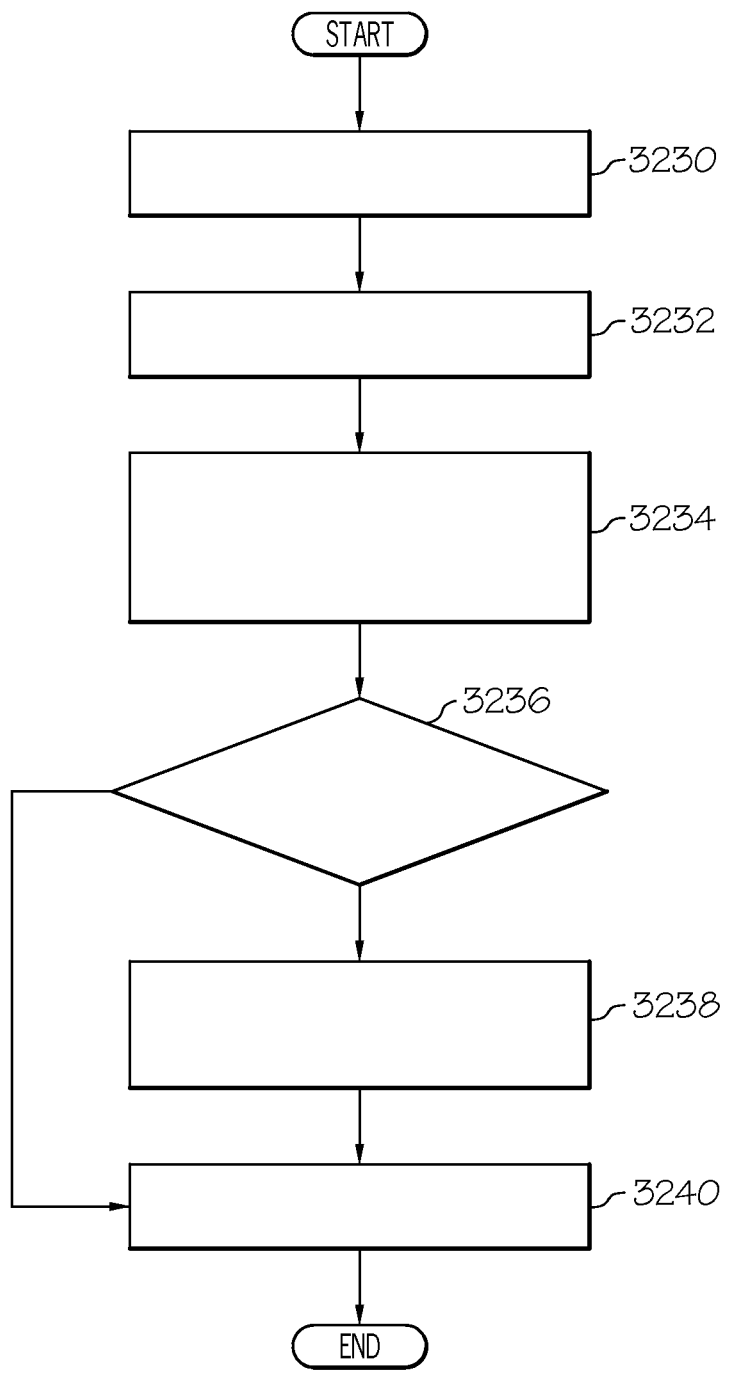
FIG. 32 depicts a process for providing a validation tool to determine information related to a term in a document, according to embodiments shown and described herein.

FIG. 32 depicts a process for providing a validation tool to determine information related to a term in a document, according to embodiments shown and described herein. As illustrated in block 3230 a potential term of interest can be determined from a document. At block 3232, a type of term of interest may be determined from the potential term of interest. More specifically, an identification may be made regarding whether the potential term of interest is a person, entity, legal citation, etc. At block 3234, a search may be performed based on the type of term of interest to determine whether the potential term of interest is an actual term of interest. At block 3236, a determination may be made regarding whether a plurality of results was revealed in the search. If so, at block 3238, the results may be filtered based on the context of the document and/or from external data, as described above. At block 3240, the results may be provided to the user.

Accordingly, embodiments disclosed herein include systems, methods, and/or non-transitory computer-readable mediums for providing a validation tool. Such embodiments may be configured to determine whether a document includes a term of interest. If a term of interest is present in the document, embodiments disclosed herein may be configured to access related data for the term of interest and provide the related data in a second window. This allows easy retrieval of the related data, as well as provides a mechanism to ensure accuracy in the terms of interest. Additional features are also discussed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for providing a validation tool comprising:
   a local computing device that comprises a memory component, the memory component storing validation tool logic that causes the system to perform at least the following:
   identify a plurality of words within a document, the document being provided in a first window within a user interface, wherein identifying the plurality of words includes determining that the plurality of words are formatted as a potential term of interest;
   access a predetermined list that includes terms of interest, wherein the predetermined list that includes the terms of interest is distinct from the document, wherein the predetermined list is common to a plurality of different documents;
   determine, from a predetermined list that includes the terms of interest, whether the plurality of words are matching words with the terms of interest;
   in response to determining that the plurality of words are matching words with the terms of interest, highlight the matching words in the document;
   perform a search for other documents that include the terms of interest;
   access pieces of related data from the other documents for the matching words;
   replace each of the matching words in the document with a corresponding link to the pieces of related data in the other documents; and
   create a second window within the user interface and provide the pieces of related data in the second window as a virtual document stack, wherein selection of one of the pieces of related data in the virtual document stack causes the document in the first window to scroll to one of the matching words in the document.

2. The system of claim 1, wherein the terms of interest include at least one of the following: a legal citation, a legal term, an entity name, and a person name.

3. The system of claim 1, wherein the validation tool logic further causes the system to provide an option to provide a legal matter to which a user is authorized.

4. The system of claim 1, wherein the validation tool logic further causes the system to determine validity of a legal document that corresponds to the plurality of words.

5. The system of claim 1, wherein navigation of the document in the first window causes corresponding navigation of the virtual document stack in the second window.

6. The system of claim 1, wherein the validation tool logic further causes the system to provide a keyword search function that receives a keyword for searching at least one of the following, according to a user selection: an online search tool, a first computing device on a wide area network, a second computing device on a local area network, and the local computing device.

7. The system of claim 1, wherein the system further stores a document application and a communicator application and wherein the document is provided by at least one of the following: the document application and the communicator application.

8. A method for providing a validation tool comprising the steps of:
   identifying, by a local computing device, a plurality of words within a document that are formatted as a potential term of interest, the document being provided in a first window within a user interface;
   accessing a predetermined list that includes terms of interest, wherein the predetermined list that includes the terms of interest is distinct from the document;
   determining, from the predetermined list that includes the terms of interest, whether the plurality of words are matching words with the terms of interest;
   in response to determining that the plurality of words are matching words with the terms of interest, highlighting the matching words in the document, wherein the predetermined list is static across a plurality of different documents;
   performing a search for other documents that include the terms of interest;
   accessing pieces of related data from the other documents for the matching words;
   replacing each of the matching words in the document with a corresponding link to the pieces of related data in the other documents; and
   creating a second window within the user interface and providing the pieces of related data in the second window as a virtual document stack, wherein selection of one of the pieces of related data in the virtual document stack causes the document in the first window to scroll to one of the matching words in the document.

9. The method of claim 8, wherein the terms of interest include at least one of the following: a legal citation, a legal term, an entity name, and a person name.

10. The method if claim 8, further comprising providing an option to provide a legal matter to which a user is authorized.

11. The method of claim 8, further comprising determining validity of a legal document that corresponds to the plurality of words.

12. The method of claim 8, wherein navigation of the document in the first window causes corresponding navigation of the virtual document stack in the second window.

13. The method of claim 8, further comprising providing a keyword search function that receives a keyword for searching at least one of the following, according to a user selection: an online search tool, a first computing device on a wide area network, a second computing device on a local area network, and the local computing device.

14. A non-transitory computer-readable medium for providing a validation tool that stores validation tool logic, that when executed by a local computing device, causes the local computing device to perform at least the following:
   identify a plurality of words within a document that are formatted as a potential term of interest, the document being provided in a first window within a user interface;
   access a predetermined list that includes terms of interest, wherein the predetermined list that includes the terms of interest is distinct from the document, wherein the predetermined list is populated independent from the electronic document;
   determine, from a predetermined list that includes terms of interest, whether the plurality of words are matching words with the terms of interest;
   in response to determining that the plurality of words are matching words with the terms of interest, highlight the matching words in the document;
   perform a search for other documents that include the terms of interest;
   access pieces of related data from the other documents for the matching words;
   determine whether the matching words include any inaccuracies;
   replace each of the matching words in the document with a corresponding link to the pieces of related data in the other documents; and
   create a second window within the user interface and provide the pieces of related data in the second window as a virtual document stack, wherein selection of one of the pieces of related data in the virtual document stack causes the document in the first window to scroll to one of the matching words in the document.

15. The non-transitory computer-readable medium of claim 14, wherein the terms of interest include at least one of the following: a legal citation, a legal term, an entity name, and a person name.

16. The non-transitory computer-readable medium of claim 14, wherein the validation tool further causes the local computing device to provide an option to provide a legal matter to which a user is authorized.

17. The non-transitory computer-readable medium of claim 14, wherein the other documents include a legal document and wherein the validation tool logic further causes the local computing device to determine validity of the law included in the legal document.

18. The non-transitory computer-readable medium of claim 14, wherein navigation of the document in the first window causes corresponding navigation of the virtual document stack in the second window.

19. The non-transitory computer-readable medium of claim 14, wherein the validation tool logic further causes the local computing device to provide a keyword search function that receives a keyword for searching at least one of the following, according to a user selection: an online search tool, a first computing device on a wide area network, a second computing device on a local area network, and the local computing device.

20. The non-transitory computer-readable medium of claim 14, further comprising document logic and communicator logic and wherein the document is provided by at least one of the following: the document logic and the communicator logic.

* * * * *